United States Patent
Zhu et al.

(10) Patent No.: US 12,152,570 B2
(45) Date of Patent: Nov. 26, 2024

(54) SHAPE MEMORY MATERIAL MEMBER-BASED ACTUATOR WITH ELECTROSTATIC CLUTCH PRELIMINARY CLASS

(71) Applicant: Toyota Motor Engineering & Manufacturing North America, Inc., Plano, TX (US)

(72) Inventors: Yufei Zhu, Ann Arbor, MI (US); Paul A. Gilmore, Ann Arbor, MI (US); Taewoo Nam, Ann Arbor, MI (US); Rikin Gupta, Manassas, VA (US); Xintong Deng, Belleville, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/172,637

(22) Filed: Feb. 22, 2023

(65) Prior Publication Data
US 2024/0280088 A1 Aug. 22, 2024

(51) Int. Cl.
*F03G 7/06* (2006.01)
*H02N 13/00* (2006.01)

(52) U.S. Cl.
CPC ......... *F03G 7/06143* (2021.08); *F03G 7/062* (2021.08); *H02N 13/00* (2013.01); *F03G 7/066* (2021.08)

(58) Field of Classification Search
CPC ...... F03G 7/06143; F03G 7/062; F03G 7/066; H02N 13/00
See application file for complete search history.

(56) References Cited

U.S. PATENT DOCUMENTS

| 1,658,669 A | 2/1928 | Cohn et al. |
| 2,322,755 A | 6/1943 | Voorhies |

(Continued)

FOREIGN PATENT DOCUMENTS

| CN | 201037277 | 3/2008 |
| CN | 101367433 A | 2/2009 |

(Continued)

OTHER PUBLICATIONS

A web page entitled "What is Electrostatic Chuck?" to Edragon Technology Corporation of Zhubei City, Taiwan, https://edragoncorp.weebly.com/what-is-electrostatic-chuck.html (the Edragon Website).

(Continued)

*Primary Examiner* — Shafiq Mian
(74) *Attorney, Agent, or Firm* — Christopher G. Darrow; Darrow Mustafa PC

(57) ABSTRACT

An actuator can include one or more shape memory material members and an electrostatic clutch. When an activation input is provided to the one or more shape memory material members, the one or more shape memory material members contract, which causes the actuator to morph into an activated configuration. A height of the actuator increases in the activated configuration. The electrostatic clutch can be configured to maintain the actuator in the activated configuration when the activation input to the one or more shape memory material members is discontinued. One or more processors can be operatively connected to selectively and independently activate the one or more shape memory material members and the electrostatic clutch.

20 Claims, 6 Drawing Sheets

(56) References Cited

U.S. PATENT DOCUMENTS

| | | |
|---|---|---|
| 2,588,706 A | 3/1952 | Davis |
| 3,394,631 A | 7/1968 | Thompson |
| 3,706,102 A | 12/1972 | Grenier |
| 4,063,826 A | 12/1977 | Riepe |
| 4,244,140 A | 1/1981 | Kim |
| 4,396,220 A | 8/1983 | Dieckmann et al. |
| 4,498,851 A | 2/1985 | Kolm et al. |
| 4,522,447 A | 6/1985 | Snyder et al. |
| 4,544,988 A | 10/1985 | Hochstein |
| 4,553,393 A | 11/1985 | Ruoff |
| 4,595,338 A | 6/1986 | Kolm et al. |
| 4,779,852 A | 10/1988 | Wassell |
| 4,780,062 A | 10/1988 | Yamada et al. |
| 4,806,815 A | 2/1989 | Homma |
| 4,811,564 A | 3/1989 | Palmer |
| 4,834,619 A | 5/1989 | Walton |
| 4,898,426 A | 2/1990 | Schulz et al. |
| 4,923,000 A | 5/1990 | Nelson |
| 4,944,755 A | 7/1990 | Hennequin et al. |
| 4,955,196 A | 9/1990 | Lin et al. |
| 4,964,402 A | 10/1990 | Grim et al. |
| 5,069,219 A | 12/1991 | Knoblich |
| 5,088,115 A | 2/1992 | Napolitano |
| 5,129,753 A | 7/1992 | Wesley et al. |
| 5,250,167 A | 10/1993 | Adolf et al. |
| 5,255,390 A | 10/1993 | Gross et al. |
| 5,279,123 A | 1/1994 | Wechsler et al. |
| 5,482,351 A | 1/1996 | Young et al. |
| 5,488,255 A | 1/1996 | Sato et al. |
| 5,522,712 A | 6/1996 | Winn |
| 5,583,844 A | 12/1996 | Wolf et al. |
| 5,619,177 A | 4/1997 | Johnson et al. |
| 5,622,482 A | 4/1997 | Lee |
| 5,662,376 A | 9/1997 | Breuer et al. |
| 5,678,247 A | 10/1997 | Vickers |
| 5,686,003 A | 11/1997 | Ingram et al. |
| 5,747,140 A | 5/1998 | Heerklotz |
| 5,771,742 A | 6/1998 | Bokaie et al. |
| 5,846,629 A | 12/1998 | Gwinn |
| 5,853,005 A | 12/1998 | Scanlon |
| 5,861,703 A | 1/1999 | Losinski |
| 6,043,978 A | 3/2000 | Mody et al. |
| 6,053,553 A | 4/2000 | Hespelt |
| 6,093,910 A | 7/2000 | McClintock et al. |
| 6,116,257 A | 9/2000 | Yokota et al. |
| 6,142,563 A | 11/2000 | Townsend et al. |
| 6,155,716 A | 12/2000 | Okamura |
| 6,186,047 B1 | 2/2001 | Baruffaldi |
| 6,227,515 B1 | 5/2001 | Broyles |
| 6,379,393 B1 | 4/2002 | Mavroidis et al. |
| 6,394,001 B1 | 5/2002 | Giesey et al. |
| 6,404,098 B1 | 6/2002 | Kayama et al. |
| 6,422,010 B1 | 7/2002 | Julien |
| 6,443,524 B1 | 9/2002 | Yu |
| 6,481,799 B1 | 11/2002 | Whalen |
| 6,508,437 B1 | 1/2003 | Davis et al. |
| 6,530,217 B1 | 3/2003 | Yokota et al. |
| 6,546,806 B1 | 4/2003 | Varma |
| 6,591,188 B1 | 7/2003 | Ohler |
| 6,628,522 B2 | 9/2003 | Trautman et al. |
| 6,664,718 B2 | 12/2003 | Perline et al. |
| 6,719,694 B2 | 4/2004 | Weng et al. |
| 6,740,994 B2 | 5/2004 | Lee et al. |
| 6,773,535 B1 | 8/2004 | Wetzel |
| 6,809,462 B2 | 10/2004 | Pelrine et al. |
| 6,896,324 B1 | 5/2005 | Kull et al. |
| 6,910,714 B2 | 6/2005 | Browne et al. |
| 6,912,748 B2 | 7/2005 | VanSickle |
| 6,943,653 B2 | 9/2005 | Hanke et al. |
| 6,972,659 B2 | 12/2005 | von Behrens et al. |
| 6,998,546 B1 | 2/2006 | Schmidt et al. |
| 7,017,345 B2 | 3/2006 | Von Behrens et al. |
| 7,086,322 B2 | 8/2006 | Schulz |
| 7,093,903 B2 | 8/2006 | O'Connor et al. |
| 7,100,990 B2 | 9/2006 | Kimura et al. |
| 7,108,316 B2 | 9/2006 | Barvosa-Carter et al. |
| 7,117,673 B2 | 10/2006 | Szilagyi |
| 7,125,077 B2 | 10/2006 | Frank |
| 7,204,472 B2 | 4/2007 | Jones et al. |
| 7,237,847 B2 | 7/2007 | Hancock et al. |
| 7,256,518 B2 | 8/2007 | Gummin |
| 7,293,836 B2 | 11/2007 | Browne et al. |
| 7,306,187 B2 | 12/2007 | Lavan |
| 7,309,104 B2 | 12/2007 | Browne et al. |
| 7,331,616 B2 | 2/2008 | Brei et al. |
| 7,336,486 B2 | 2/2008 | Mongia |
| 7,350,851 B2 | 4/2008 | Barvosa-Carter et al. |
| 7,364,211 B2 | 4/2008 | Niskanen et al. |
| 7,371,052 B2 | 5/2008 | Koeneman |
| 7,446,450 B2 | 11/2008 | Boland et al. |
| 7,448,678 B2 | 11/2008 | Browne et al. |
| 7,476,224 B2 | 1/2009 | Petrakis |
| 7,478,845 B2 | 1/2009 | Mankame et al. |
| 7,484,735 B2 | 2/2009 | Verbrugge et al. |
| 7,501,607 B2 | 3/2009 | Camm et al. |
| 7,506,937 B2 | 3/2009 | Bequet |
| 7,511,402 B2 | 3/2009 | Ito et al. |
| 7,527,312 B1 | 5/2009 | Cucknell et al. |
| 7,556,313 B2 | 7/2009 | Browne et al. |
| 7,578,661 B2 | 8/2009 | Koeneman |
| 7,594,697 B2 | 9/2009 | Browne et al. |
| 7,619,894 B2 | 11/2009 | Wang et al. |
| 7,661,764 B2 | 2/2010 | Ali et al. |
| 7,709,995 B2 | 5/2010 | Hanlon et al. |
| 7,717,520 B2 | 5/2010 | Boren et al. |
| 7,729,828 B2 | 6/2010 | Gandhi |
| 7,731,279 B2 | 6/2010 | Asada et al. |
| 7,735,940 B2 | 6/2010 | Chiu |
| 7,756,246 B2 | 7/2010 | Mikami et al. |
| 7,758,121 B2 | 7/2010 | Browne et al. |
| 7,766,423 B2 | 8/2010 | Alexander et al. |
| 7,770,391 B2 | 8/2010 | Melz |
| 7,814,810 B2 | 10/2010 | Mitteer |
| 7,823,382 B2 | 11/2010 | Ukpai et al. |
| 7,823,972 B2 | 11/2010 | Browne et al. |
| 7,834,527 B2 | 11/2010 | Rivera et al. |
| 7,878,459 B2 | 2/2011 | Mabe et al. |
| 7,883,148 B2 | 2/2011 | Alexander et al. |
| 7,892,630 B1 | 2/2011 | McKnight et al. |
| 7,901,524 B1 | 3/2011 | McKnight et al. |
| 7,905,538 B2 | 3/2011 | Ukpai et al. |
| 7,905,547 B2 | 3/2011 | Lawall et al. |
| 7,909,403 B2 | 3/2011 | Lawall et al. |
| 7,964,290 B2 | 6/2011 | Mullner et al. |
| 7,965,509 B2 | 6/2011 | Campbell et al. |
| 7,971,296 B2 | 7/2011 | Jansen |
| 7,971,939 B2 | 7/2011 | Fujita et al. |
| 8,016,952 B2 | 9/2011 | Ishida et al. |
| 8,038,215 B2 | 10/2011 | Di Gusto et al. |
| 8,052,112 B2 | 11/2011 | Lawall et al. |
| 8,056,335 B1 | 11/2011 | Brown |
| 8,100,471 B2 | 1/2012 | Lawall et al. |
| 8,109,567 B2 | 2/2012 | Alexander et al. |
| 8,126,615 B2 | 2/2012 | McMillen et al. |
| 8,172,458 B2 | 5/2012 | Petrakis |
| 8,240,677 B2 | 8/2012 | Browne et al. |
| 8,313,108 B2 | 11/2012 | Ac et al. |
| 8,362,882 B2 | 1/2013 | Heubel et al. |
| 8,366,057 B2 | 2/2013 | Vos et al. |
| 8,414,366 B2 | 4/2013 | Browne et al. |
| 8,446,475 B2 | 5/2013 | Topliss et al. |
| 8,448,435 B2 | 5/2013 | Gregory et al. |
| 8,510,924 B2 | 8/2013 | Mankame et al. |
| 8,584,456 B1 | 11/2013 | McKnight |
| 8,585,456 B2 | 11/2013 | Canon |
| 8,593,568 B2 | 11/2013 | Topliss et al. |
| 8,649,242 B2 | 2/2014 | Martin et al. |
| 8,681,496 B2 | 3/2014 | Dede |
| 8,695,334 B2 | 4/2014 | Lewis et al. |
| 8,702,120 B2 | 4/2014 | Kalisz et al. |
| 8,721,557 B2 | 5/2014 | Chen et al. |
| 8,741,076 B2 | 6/2014 | Gao et al. |
| 8,756,933 B2 | 6/2014 | Topliss et al. |
| 8,793,821 B2 | 8/2014 | Fowkes et al. |

(56) References Cited

U.S. PATENT DOCUMENTS

| | | |
|---|---|---|
| 8,827,709 B1 | 9/2014 | Gurule et al. |
| 8,830,335 B2 | 9/2014 | Topliss et al. |
| 8,853,916 B2 | 10/2014 | Browne et al. |
| 8,880,141 B2 | 11/2014 | Chen |
| 8,881,347 B2 | 11/2014 | Feinstein |
| 8,894,142 B2 | 11/2014 | Alexander et al. |
| 8,912,709 B2 | 12/2014 | Pollock et al. |
| 8,991,769 B2 | 3/2015 | Gandhi |
| 8,998,320 B2 | 4/2015 | Mankame et al. |
| 9,068,561 B2 | 6/2015 | Gondo |
| 9,086,069 B2 | 7/2015 | Dede |
| 9,140,243 B2 | 9/2015 | Gandhi et al. |
| 9,168,814 B2 | 10/2015 | Gandhi |
| 9,171,686 B2 | 10/2015 | Alacqua et al. |
| 9,180,525 B2 | 11/2015 | Park et al. |
| 9,267,495 B2 | 2/2016 | Kopfer et al. |
| 9,298,207 B2 | 3/2016 | Li |
| 9,347,609 B2 | 5/2016 | Pinto, IV et al. |
| 9,428,088 B1 | 8/2016 | Rajasingham |
| 9,457,813 B2 | 10/2016 | Hoerwick et al. |
| 9,457,887 B2 | 10/2016 | Roe et al. |
| 9,495,875 B2 | 11/2016 | Dowdall et al. |
| 9,512,829 B2 | 12/2016 | Alacqua et al. |
| 9,550,466 B2 | 1/2017 | Gandhi |
| 9,588,020 B2 | 3/2017 | Browne et al. |
| 9,662,197 B2 | 5/2017 | Yun et al. |
| 9,664,182 B2 | 5/2017 | Nicolini et al. |
| 9,664,210 B2 | 5/2017 | Ou et al. |
| 9,684,183 B2 | 6/2017 | Brown et al. |
| 9,696,175 B2 | 7/2017 | Hansen et al. |
| 9,697,708 B2 | 7/2017 | Adrezin et al. |
| 9,714,460 B2 | 7/2017 | Merideth |
| 9,719,534 B2 | 8/2017 | Shevchenko et al. |
| 9,731,828 B2 | 8/2017 | Lichota |
| 9,764,220 B2 | 9/2017 | Keating et al. |
| 9,784,249 B2 | 10/2017 | Li et al. |
| 9,784,590 B2 | 10/2017 | Englehardt et al. |
| 9,827,888 B2 | 11/2017 | Patrick et al. |
| 9,848,814 B2 | 12/2017 | Benson et al. |
| 9,943,437 B2 | 4/2018 | Lowe et al. |
| 9,945,490 B2 | 4/2018 | Dankbaar et al. |
| 9,981,421 B2 | 5/2018 | Macroe et al. |
| 9,994,136 B2 | 6/2018 | Nakada |
| 10,007,263 B1 | 6/2018 | Fields et al. |
| 10,029,618 B2 | 7/2018 | Perez Astudillo et al. |
| 10,059,334 B1 | 8/2018 | Zhu et al. |
| 10,061,350 B2 | 8/2018 | Magi |
| 10,066,829 B2 | 9/2018 | Wong et al. |
| 10,168,782 B1 | 1/2019 | Tchon et al. |
| 10,191,550 B1 | 1/2019 | Nussbaum et al. |
| 10,208,823 B2 | 2/2019 | Kashani |
| 10,299,520 B1 | 5/2019 | Shaffer et al. |
| 10,302,586 B2 | 5/2019 | Sun et al. |
| 10,315,771 B1 | 6/2019 | Rao et al. |
| 10,330,144 B1 | 6/2019 | Alqasimi et al. |
| 10,330,400 B2 | 6/2019 | Dede |
| 10,335,044 B2 | 7/2019 | Banet et al. |
| 10,349,543 B2 | 7/2019 | Sreetharan et al. |
| 10,355,624 B2 | 7/2019 | Majdi et al. |
| 10,371,229 B2 | 8/2019 | Gandhi et al. |
| 10,371,299 B2 | 8/2019 | Leffler |
| 10,377,278 B2 | 8/2019 | Ketels et al. |
| 10,427,634 B2 | 10/2019 | Gandhi et al. |
| 10,434,973 B2 | 10/2019 | Gandhi et al. |
| 10,441,491 B2 | 10/2019 | Wyatt et al. |
| 10,459,475 B2 | 10/2019 | Gandhi et al. |
| 10,479,246 B2 | 11/2019 | Meingast et al. |
| 10,532,672 B1 | 1/2020 | Pinkelman et al. |
| 10,583,757 B2 | 3/2020 | Ketels et al. |
| 10,591,078 B2 | 3/2020 | Oehler et al. |
| 10,647,237 B2 | 5/2020 | Song |
| 10,677,310 B2 | 6/2020 | Gandhi et al. |
| 10,682,931 B2 | 6/2020 | Rowe et al. |
| 10,759,320 B2 | 9/2020 | Mochizuki |
| 10,773,487 B2 | 9/2020 | Frigerio et al. |
| 10,781,800 B2 | 9/2020 | Brown et al. |
| 10,814,514 B2 | 10/2020 | Aihara |
| 10,843,611 B2 | 11/2020 | Caruss et al. |
| 10,933,974 B2 | 3/2021 | Tsuruta et al. |
| 10,960,793 B2 | 3/2021 | Gandhi et al. |
| 10,965,172 B2 | 3/2021 | Dede et al. |
| 10,993,526 B2 | 5/2021 | Vandewall et al. |
| 10,995,779 B2 | 5/2021 | Keplinger et al. |
| 11,048,329 B1 | 6/2021 | Lee et al. |
| 11,091,060 B2 | 8/2021 | Pinkelman et al. |
| 11,125,248 B2 | 9/2021 | Joshi et al. |
| 11,137,045 B2 | 10/2021 | Gandhi et al. |
| 11,180,052 B2 | 11/2021 | Severgnini et al. |
| 11,241,842 B2 | 2/2022 | Gandhi et al. |
| 11,247,584 B2 | 2/2022 | Breitweg et al. |
| 11,248,592 B1 | 2/2022 | Tsuruta et al. |
| 11,269,891 B2 | 3/2022 | Frank et al. |
| 11,285,844 B2 | 3/2022 | Gandhi et al. |
| 11,353,009 B1 | 6/2022 | Rowe et al. |
| 11,356,255 B1 | 6/2022 | Emelyanov et al. |
| 11,370,330 B2 | 6/2022 | Gandhi et al. |
| 11,372,481 B2 | 6/2022 | Leroy et al. |
| 11,377,007 B2 | 7/2022 | Samain et al. |
| 11,458,874 B2 | 10/2022 | Nagai et al. |
| 11,460,009 B1 | 10/2022 | Tsuruta et al. |
| 11,460,010 B1 | 10/2022 | Tsuruta et al. |
| 11,467,669 B2 | 10/2022 | Liu et al. |
| 11,472,325 B1 | 10/2022 | Tsuruta et al. |
| 11,486,421 B2 | 11/2022 | Keplinger et al. |
| 11,536,255 B1 | 12/2022 | Rowe |
| 11,542,925 B1 | 1/2023 | Rowe et al. |
| 11,577,471 B2 | 2/2023 | Gandhi et al. |
| 11,591,076 B2 | 2/2023 | Song et al. |
| 11,592,010 B1 | 2/2023 | Panwar et al. |
| 11,592,037 B1 | 2/2023 | Rowe et al. |
| 11,603,153 B1 | 3/2023 | Trager et al. |
| 11,603,828 B2 | 3/2023 | Gummin et al. |
| 11,624,376 B2 | 4/2023 | Rowe et al. |
| 11,628,898 B1 | 4/2023 | Trager et al. |
| 11,642,083 B2 | 5/2023 | Severgnini et al. |
| 11,649,808 B2 | 5/2023 | Tsuruta et al. |
| 11,668,287 B2 | 6/2023 | Naly et al. |
| 11,702,015 B2 | 7/2023 | Pinkelman et al. |
| 11,732,735 B2 | 8/2023 | Song et al. |
| 11,750,115 B2 | 9/2023 | Saneyoshi et al. |
| 11,752,901 B2 | 9/2023 | Gandhi et al. |
| 11,795,924 B2 | 10/2023 | Rowe |
| 11,840,161 B2 | 12/2023 | Schmalenberg et al. |
| 11,841,008 B1 | 12/2023 | Panwar et al. |
| 11,885,428 B2 | 1/2024 | Panwar et al. |
| 11,897,379 B2 | 2/2024 | Tsuruta et al. |
| 11,913,436 B2 | 2/2024 | Easton et al. |
| 11,927,206 B2 | 3/2024 | Rowe et al. |
| 2002/0130754 A1 | 9/2002 | Alacqua et al. |
| 2002/0179663 A1 | 12/2002 | Moore et al. |
| 2003/0000605 A1 | 1/2003 | Homma |
| 2003/0182041 A1 | 9/2003 | Watson |
| 2004/0035108 A1 | 2/2004 | Szilagyi |
| 2004/0041998 A1 | 3/2004 | Haddad |
| 2004/0104580 A1 | 6/2004 | Spiessl et al. |
| 2004/0118854 A1 | 6/2004 | Kutun |
| 2004/0145230 A1 | 7/2004 | Fujita et al. |
| 2004/0195888 A1 | 10/2004 | Frye |
| 2004/0256920 A1 | 12/2004 | Gummin et al. |
| 2004/0261411 A1 | 12/2004 | MacGregor |
| 2005/0023086 A1 | 2/2005 | Szilagyi |
| 2005/0082897 A1 | 4/2005 | Ropp et al. |
| 2005/0066810 A1 | 5/2005 | Schulz |
| 2005/0111177 A1 | 5/2005 | Kwitek |
| 2005/0146147 A1 | 7/2005 | Niskanen et al. |
| 2005/0198904 A1 | 9/2005 | Browne et al. |
| 2005/0199455 A1 | 9/2005 | Browne et al. |
| 2005/0199845 A1 | 9/2005 | Jones et al. |
| 2005/0206096 A1 | 9/2005 | Browne et al. |
| 2005/0210874 A1 | 9/2005 | Browne et al. |
| 2005/0211198 A1 | 9/2005 | Froeschle et al. |
| 2005/0227607 A1 | 10/2005 | Stevenson et al. |
| 2005/0253425 A1 | 11/2005 | Asada et al. |
| 2006/0033312 A1 | 2/2006 | Barvosa-Carter et al. |

(56) References Cited

U.S. PATENT DOCUMENTS

| | | |
|---|---|---|
| 2006/0038643 A1 | 2/2006 | Xu et al. |
| 2006/0038745 A1 | 2/2006 | Naksen et al. |
| 2006/0074325 A1 | 4/2006 | Karo et al. |
| 2006/0201149 A1 | 9/2006 | Biggs et al. |
| 2006/0223637 A1 | 10/2006 | Rosenberg |
| 2006/0226013 A1 | 10/2006 | Decre et al. |
| 2006/0244293 A1 | 11/2006 | Buffa |
| 2006/0265965 A1 | 11/2006 | Butera et al. |
| 2007/0025575 A1 | 2/2007 | Oser et al. |
| 2007/0046074 A1 | 3/2007 | Satta et al. |
| 2007/0063566 A1 | 3/2007 | Browne et al. |
| 2007/0084220 A1 | 4/2007 | Asada et al. |
| 2007/0188004 A1 | 8/2007 | Browne et al. |
| 2007/0205853 A1 | 9/2007 | Taya et al. |
| 2007/0236071 A1 | 10/2007 | Fujita et al. |
| 2007/0246285 A1 | 10/2007 | Browne et al. |
| 2007/0246898 A1 | 10/2007 | Keefe et al. |
| 2007/0246979 A1 | 10/2007 | Browne et al. |
| 2007/0271939 A1 | 11/2007 | Ichigaya |
| 2007/0277877 A1 | 12/2007 | Ghorbal et al. |
| 2008/0006353 A1 | 1/2008 | Elzey et al. |
| 2008/0018198 A1 | 1/2008 | Sohn et al. |
| 2008/0085436 A1 | 4/2008 | Langan et al. |
| 2008/0100118 A1 | 5/2008 | Young et al. |
| 2008/0114218 A1 | 5/2008 | Suyama et al. |
| 2008/0219501 A1 | 9/2008 | Matsumoto |
| 2008/0267770 A1 | 10/2008 | Webster et al. |
| 2008/0271559 A1 | 11/2008 | Garscha et al. |
| 2008/0272259 A1 | 11/2008 | Zavattieri et al. |
| 2008/0307786 A1 | 12/2008 | Hafez et al. |
| 2009/0008973 A1 | 1/2009 | Browne |
| 2009/0009656 A1 | 1/2009 | Honda et al. |
| 2009/0030576 A1 | 1/2009 | Periot et al. |
| 2009/0041085 A1 | 2/2009 | Petrakis |
| 2009/0108607 A1 | 4/2009 | Browne et al. |
| 2009/0115284 A1 | 5/2009 | Liang et al. |
| 2009/0131752 A1 | 5/2009 | Park |
| 2009/0143730 A1 | 6/2009 | De Polo et al. |
| 2009/0173305 A1 | 7/2009 | Alexander et al. |
| 2009/0212158 A1* | 8/2009 | Mabe ............... F03G 7/065 244/1 N |
| 2009/0218858 A1 | 9/2009 | Lawall et al. |
| 2009/0224584 A1 | 9/2009 | Lawall et al. |
| 2009/0224587 A1 | 9/2009 | Lawall et al. |
| 2009/0241537 A1 | 10/2009 | Browne et al. |
| 2009/0242285 A1 | 10/2009 | Whetstone, Jr. |
| 2009/0283643 A1 | 11/2009 | Sar et al. |
| 2009/0284059 A1 | 11/2009 | Gupta et al. |
| 2010/0001568 A1 | 1/2010 | Trybus et al. |
| 2010/0027119 A1 | 2/2010 | Kollar et al. |
| 2010/0031525 A1 | 2/2010 | Allezy et al. |
| 2010/0036567 A1 | 2/2010 | Gandhi |
| 2010/0066142 A1 | 3/2010 | Gross et al. |
| 2010/0192567 A1 | 8/2010 | Butera |
| 2010/0212312 A1 | 8/2010 | Rudduck |
| 2010/0221124 A1 | 9/2010 | Ikushima et al. |
| 2010/0244505 A1 | 9/2010 | Demick et al. |
| 2010/0282902 A1 | 11/2010 | Rajasingham |
| 2010/0287965 A1 | 11/2010 | Bryant |
| 2010/0294476 A1 | 11/2010 | Gomi et al. |
| 2010/0308689 A1 | 12/2010 | Rahman et al. |
| 2010/0326070 A1 | 12/2010 | Hao et al. |
| 2011/0021932 A1 | 1/2011 | Kim et al. |
| 2011/0030380 A1 | 2/2011 | Widdle, Jr. et al. |
| 2011/0038727 A1 | 2/2011 | Vos et al. |
| 2011/0111839 A1 | 5/2011 | Lesley et al. |
| 2011/0120119 A1* | 5/2011 | Alexander ............ F02G 5/04 60/527 |
| 2011/0150669 A1 | 6/2011 | Frayne et al. |
| 2011/0179790 A1 | 7/2011 | Pretorius |
| 2011/0217031 A1 | 9/2011 | Eromaki |
| 2011/0300358 A1 | 12/2011 | Blohowiak et al. |
| 2012/0019216 A1 | 1/2012 | Lewis et al. |
| 2012/0049095 A1 | 3/2012 | Yamasaki |
| 2012/0056459 A1 | 3/2012 | Harden |
| 2012/0081337 A1 | 4/2012 | Camp, Jr. et al. |
| 2012/0109025 A1 | 5/2012 | Weinberg et al. |
| 2012/0136126 A1 | 5/2012 | Rousseau |
| 2012/0181896 A1 | 7/2012 | Kornbluh et al. |
| 2012/0232783 A1 | 9/2012 | Calkins et al. |
| 2012/0237309 A1 | 9/2012 | Park et al. |
| 2012/0239183 A1 | 9/2012 | Mankame et al. |
| 2012/0267928 A1 | 10/2012 | Mankame et al. |
| 2012/0276807 A1 | 11/2012 | Cabrera |
| 2012/0292155 A1 | 11/2012 | Gunter |
| 2012/0297763 A1 | 11/2012 | Mankame et al. |
| 2012/0319445 A1 | 12/2012 | Zolno et al. |
| 2013/0005442 A1 | 1/2013 | Erickson et al. |
| 2013/0011806 A1 | 1/2013 | Gao et al. |
| 2013/0043354 A1 | 2/2013 | Shome et al. |
| 2013/0075210 A1 | 3/2013 | Langbein et al. |
| 2013/0098029 A1 | 4/2013 | Pinto, IV et al. |
| 2013/0188313 A1 | 7/2013 | Dede |
| 2013/0205770 A1 | 8/2013 | Browne et al. |
| 2013/0227943 A1 | 9/2013 | Mance et al. |
| 2014/0130491 A1 | 5/2014 | Gandhi et al. |
| 2014/0168894 A1 | 6/2014 | Dede |
| 2014/0196633 A1 | 7/2014 | Shaw |
| 2014/0207333 A1 | 7/2014 | Vandivier et al. |
| 2014/0239677 A1 | 8/2014 | Laib et al. |
| 2014/0250881 A1 | 9/2014 | Yamamoto |
| 2014/0265468 A1 | 9/2014 | Greenhill et al. |
| 2014/0277739 A1 | 9/2014 | Kornbluh et al. |
| 2014/0298794 A1 | 10/2014 | Flaschentrager et al. |
| 2014/0314976 A1 | 10/2014 | Niiyama et al. |
| 2014/0316269 A1 | 10/2014 | Zhang et al. |
| 2014/0333088 A1 | 11/2014 | Lang et al. |
| 2014/0338324 A1 | 11/2014 | Jasklowski |
| 2015/0016968 A1 | 1/2015 | Grabowska et al. |
| 2015/0130220 A1 | 5/2015 | Preisler et al. |
| 2015/0185764 A1 | 7/2015 | Magi |
| 2015/0197173 A1 | 7/2015 | Hulway |
| 2015/0202993 A1 | 7/2015 | Mankame et al. |
| 2015/0274078 A1 | 10/2015 | Alacqua et al. |
| 2015/0289994 A1 | 10/2015 | Engeberg et al. |
| 2015/0290015 A1 | 10/2015 | Elahinia et al. |
| 2015/0331488 A1 | 11/2015 | Grant et al. |
| 2016/0004298 A1 | 1/2016 | Mazed et al. |
| 2016/0032997 A1 | 2/2016 | Seepersad et al. |
| 2016/0061345 A1 | 3/2016 | Jackson, Jr. |
| 2016/0082984 A1 | 3/2016 | Schmidt |
| 2016/0084665 A1 | 3/2016 | Englehardt et al. |
| 2016/0221475 A1 | 8/2016 | Sugiyama |
| 2016/0246374 A1 | 8/2016 | Carter et al. |
| 2016/0278459 A1 | 9/2016 | Hilty |
| 2016/0325837 A1 | 11/2016 | Erhel et al. |
| 2016/0345088 A1 | 11/2016 | Vilermo et al. |
| 2016/0375835 A1 | 12/2016 | Murray et al. |
| 2017/0116792 A1 | 4/2017 | Jelinek et al. |
| 2017/0121068 A1 | 5/2017 | Foshansky et al. |
| 2017/0123499 A1 | 5/2017 | Eid |
| 2017/0148102 A1 | 5/2017 | Franke et al. |
| 2017/0153707 A1 | 6/2017 | Subramanian et al. |
| 2017/0158104 A1 | 6/2017 | Le et al. |
| 2017/0166222 A1 | 6/2017 | James |
| 2017/0174236 A1 | 6/2017 | Worden et al. |
| 2017/0203432 A1 | 7/2017 | Andrianesis |
| 2017/0240075 A1 | 8/2017 | McCoy et al. |
| 2017/0252260 A1 | 9/2017 | Gummin et al. |
| 2017/0328384 A1 | 11/2017 | Goto et al. |
| 2017/0355288 A1 | 12/2017 | Barbat et al. |
| 2018/0001113 A1 | 1/2018 | Streeter |
| 2018/0012433 A1 | 1/2018 | Ricci |
| 2018/0036198 A1 | 2/2018 | Mergl et al. |
| 2018/0073491 A1 | 3/2018 | Gissen et al. |
| 2018/0084915 A1 | 3/2018 | Norman et al. |
| 2018/0115260 A1 | 4/2018 | Chiba et al. |
| 2018/0130347 A1 | 5/2018 | Ricci et al. |
| 2018/0132825 A1 | 5/2018 | Tachibana |
| 2018/0134191 A1 | 5/2018 | Ketels et al. |
| 2018/0141562 A1 | 5/2018 | Singhal |
| 2018/0149141 A1 | 5/2018 | Cullen et al. |
| 2018/0151035 A1 | 5/2018 | Maalouf et al. |
| 2018/0249772 A1 | 9/2018 | Koo et al. |

(56) References Cited

U.S. PATENT DOCUMENTS

| | | |
|---|---|---|
| 2018/0251234 A1 | 9/2018 | Wang |
| 2018/0264975 A1 | 9/2018 | Bonk et al. |
| 2018/0281621 A1 | 10/2018 | Kaku et al. |
| 2018/0286189 A1 | 10/2018 | Motamedi et al. |
| 2018/0321703 A1 | 11/2018 | Gandhi et al. |
| 2018/0345841 A1 | 12/2018 | Prokhorov et al. |
| 2018/0348759 A1 | 12/2018 | Freeman et al. |
| 2018/0355991 A1 | 12/2018 | Pfahler |
| 2019/0005272 A1 | 1/2019 | Gault et al. |
| 2019/0023161 A1 | 1/2019 | Sullivan et al. |
| 2019/0039525 A1 | 2/2019 | Hu |
| 2019/0041986 A1 | 2/2019 | Rihn et al. |
| 2019/0042857 A1 | 2/2019 | Endo et al. |
| 2019/0059608 A1 | 2/2019 | Yan et al. |
| 2019/0061307 A1 | 2/2019 | Chen et al. |
| 2019/0083022 A1 | 3/2019 | Huang |
| 2019/0135150 A1 | 5/2019 | Gao et al. |
| 2019/0143869 A1 | 5/2019 | Sequi et al. |
| 2019/0154122 A1 | 5/2019 | Lima et al. |
| 2019/0197842 A1 | 6/2019 | Long et al. |
| 2019/0232842 A1 | 8/2019 | Boccuccia et al. |
| 2019/0291649 A1 | 9/2019 | Ito |
| 2020/0010001 A1 | 1/2020 | Pinkelman et al. |
| 2020/0015493 A1 | 1/2020 | Ergun et al. |
| 2020/0015593 A1 | 1/2020 | Norman et al. |
| 2020/0032822 A1 | 1/2020 | Keplinger et al. |
| 2020/0088175 A1 | 3/2020 | Li et al. |
| 2020/0112269 A1 | 4/2020 | Taghavi et al. |
| 2020/0179168 A1 | 6/2020 | Kelleher et al. |
| 2020/0197250 A1 | 6/2020 | Wyatt et al. |
| 2020/0223325 A1 | 7/2020 | Pinkelman et al. |
| 2020/0238854 A1 | 7/2020 | Gandhi et al. |
| 2020/0247274 A1 | 8/2020 | Gandhi et al. |
| 2020/0276971 A1 | 9/2020 | Takeda et al. |
| 2020/0282878 A1 | 9/2020 | Gandhi et al. |
| 2020/0298732 A1 | 9/2020 | Gandhi et al. |
| 2020/0307416 A1* | 10/2020 | Gandhi ............ B60N 2/0248 |
| 2020/0309102 A1 | 10/2020 | Henderson et al. |
| 2020/0339242 A1 | 10/2020 | Tsuruta et al. |
| 2020/0377036 A1 | 12/2020 | Lee et al. |
| 2020/0378370 A1 | 12/2020 | Kopfer et al. |
| 2021/0095646 A1 | 4/2021 | Blecha et al. |
| 2021/0118597 A1 | 4/2021 | Pinkelman et al. |
| 2021/0132396 A1 | 5/2021 | Shin et al. |
| 2021/0153754 A1 | 5/2021 | Ozawa et al. |
| 2021/0162457 A1 | 6/2021 | Eberfors |
| 2021/0221269 A1 | 7/2021 | Baranowski et al. |
| 2021/0236061 A1 | 8/2021 | Severgnini et al. |
| 2021/0237809 A1 | 8/2021 | Rowe et al. |
| 2021/0265922 A1 | 8/2021 | Nakagawa |
| 2022/0001530 A1 | 1/2022 | Sameoto et al. |
| 2022/0012458 A1 | 1/2022 | Uetabira |
| 2022/0031178 A1 | 2/2022 | Brulet et al. |
| 2022/0106941 A1 | 4/2022 | Easton |
| 2022/0119202 A1 | 4/2022 | Morrissey et al. |
| 2022/0154703 A1 | 5/2022 | Shin et al. |
| 2022/0164079 A1 | 5/2022 | Severgnini et al. |
| 2022/0196109 A1 | 6/2022 | Gandhi et al. |
| 2022/0242328 A1 | 8/2022 | Pinkelman et al. |
| 2022/0258656 A1 | 8/2022 | Little |
| 2022/0299016 A1 | 9/2022 | Tsuruta et al. |
| 2022/0307485 A1 | 9/2022 | Gummin et al. |
| 2022/0314857 A1 | 10/2022 | Tsuruta et al. |
| 2022/0316458 A1 | 10/2022 | Tsuruta et al. |
| 2022/0412325 A1 | 12/2022 | Köpfer et al. |
| 2023/0078040 A1 | 3/2023 | Rowe et al. |
| 2023/0088911 A1* | 3/2023 | Song ............ F15B 15/08 92/34 |
| 2023/0120436 A1 | 4/2023 | Tsuruta et al. |
| 2023/0124526 A1 | 4/2023 | Tsuruta et al. |
| 2023/0136197 A1 | 5/2023 | Gilmore et al. |
| 2023/0179122 A1 | 6/2023 | Palaniswamy et al. |
| 2023/0191953 A1 | 6/2023 | Panwar et al. |
| 2023/0193929 A1 | 6/2023 | Rowe et al. |
| 2023/0287871 A1 | 9/2023 | Rowe |
| 2023/0312109 A1 | 10/2023 | Joshi et al. |
| 2023/0331371 A1 | 10/2023 | Gupta et al. |
| 2023/0331372 A1 | 10/2023 | Gupta et al. |
| 2023/0337827 A1 | 10/2023 | Pinkelman et al. |
| 2024/0060480 A1 | 2/2024 | Panwar et al. |

FOREIGN PATENT DOCUMENTS

| | | |
|---|---|---|
| CN | 101417152 A | 4/2009 |
| CN | 102333504 A | 1/2012 |
| CN | 102152309 B | 11/2012 |
| CN | 103038094 A | 4/2013 |
| CN | 103147511 A | 6/2013 |
| CN | 102026842 B | 7/2013 |
| CN | 103935495 A | 7/2014 |
| CN | 102765354 B | 11/2014 |
| CN | 104290617 A | 1/2015 |
| CN | 204774820 U | 11/2015 |
| CN | 105517664 A | 4/2016 |
| CN | 106168523 A | 11/2016 |
| CN | 107111473 A | 1/2017 |
| CN | 206029888 U | 3/2017 |
| CN | 105946515 B | 4/2018 |
| CN | 108100228 A | 6/2018 |
| CN | 108819806 A | 11/2018 |
| CN | 106014897 B | 12/2018 |
| CN | 106956254 B | 3/2019 |
| CN | 109572966 A | 4/2019 |
| CN | 209010975 U | 6/2019 |
| CN | 105003405 B | 7/2019 |
| CN | 107485536 B | 1/2020 |
| CN | 112411375 A | 2/2021 |
| DE | 10155119 B4 | 5/2003 |
| DE | 20309196 U1 | 11/2003 |
| DE | 10222022 A1 | 12/2003 |
| DE | 102010021902 A1 | 12/2011 |
| DE | 102016210214 A1 | 12/2017 |
| DE | 102019204866 A1 | 10/2020 |
| DE | 102008021679 B4 | 1/2021 |
| EP | 1420094 A1 | 5/2004 |
| EP | 1519055 A2 | 3/2005 |
| EP | 1904337 B1 | 10/2010 |
| EP | 2723069 A1 | 4/2014 |
| EP | 3196484 A1 | 7/2017 |
| FR | 3058108 A1 | 5/2018 |
| JP | S5870892 U | 5/1983 |
| JP | S61277898 A | 12/1986 |
| JP | H03276698 A | 12/1991 |
| JP | H06033895 A | 6/1994 |
| JP | H09168285 A | 6/1997 |
| JP | H10337061 A | 12/1998 |
| JP | 2003276698 A | 10/2003 |
| JP | 3706899 B2 | 10/2005 |
| JP | 2006000347 A | 1/2006 |
| JP | 2006006581 A | 1/2006 |
| JP | 2006248456 A | 9/2006 |
| JP | 2008014470 A | 1/2008 |
| JP | 2008138558 A | 6/2008 |
| JP | 2008154447 A | 7/2008 |
| JP | 4273902 B2 | 6/2009 |
| JP | 2009162233 A | 7/2009 |
| JP | 2010117457 A | 5/2010 |
| JP | 4576281 B2 | 11/2010 |
| JP | 5760241 | 8/2015 |
| JP | 2017175155 A | 9/2017 |
| JP | 2018188035 A | 11/2018 |
| JP | 2019094789 A | 6/2019 |
| JP | 2019101988 A | 6/2019 |
| KR | 20050056526 A | 6/2005 |
| KR | 1020130005989 | 1/2013 |
| KR | 101395364 B1 | 5/2014 |
| KR | 101861620 B1 | 4/2018 |
| KR | 1020180074003 A | 7/2018 |
| KR | 101931791 B1 | 12/2018 |
| KR | 20210052091 A | 5/2021 |
| KR | 20210086518 A | 7/2021 |
| KR | 102298464 B1 | 9/2021 |
| WO | 02011648 A1 | 2/2002 |
| WO | 2005004321 A1 | 1/2005 |

(56) References Cited

FOREIGN PATENT DOCUMENTS

| | | | |
|---|---|---|---|
| WO | 2009079668 | A2 | 6/2009 |
| WO | 2009111362 | A2 | 9/2009 |
| WO | 2011017071 | A2 | 2/2011 |
| WO | 2011111769 | A1 | 9/2011 |
| WO | 2014145018 | A2 | 9/2014 |
| WO | 2014172320 | A1 | 10/2014 |
| WO | 2015037600 | A1 | 3/2015 |
| WO | 2016017057 | A1 | 2/2016 |
| WO | 2016130719 | A2 | 8/2016 |
| WO | 2017077541 | A1 | 5/2017 |
| WO | 2019043599 | A1 | 3/2019 |
| WO | 2019097437 | A1 | 5/2019 |
| WO | 2019173227 | A1 | 9/2019 |
| WO | 2020110091 | A2 | 6/2020 |
| WO | 2020183360 | A1 | 9/2020 |
| WO | 2021118185 | A2 | 6/2021 |

OTHER PUBLICATIONS

Pinkelman et al., U.S. Appl. No. 17/729,522, filed Apr. 26, 2022.
Ou et al., "jamSheets: Thin Interfaces with Tunable Stiffness Enabled by Layer Jamming," Proceedings of the 8th International Conference on Tangible, Embedded, and Embodied Interaction, 2014 (8 pages).
Ou et al., "aeroMorph—Heat-sealing Inflatable Shape-change Materials for Interaction Design," Proceedings of the 29th Annual Symposium on User Interface Software and Technology (2016) pp. 121-132 (10 pages).
Rowe et al., U.S. Appl. No. 18/453,395, filed Aug. 22, 2023.
Rowe et al., U.S. Appl. No. 18/329,217, filed Jun. 5, 2023.
Pinkelman et al., U.S. Appl. No. 18/452,343, filed Aug. 18, 2023.
Pinkelman et al., U.S. Appl. No. 18/452,376, filed Aug. 18, 2023.
Rowe et al., U.S. Appl. No. 18/452,602, filed Aug. 21, 2023.
Rowe et al., U.S. Appl. No. 18/452,734, filed Aug. 21, 2023.
Jani et al., "A review of shape memory alloy research, applications, and opportunities", Elsevier, 2014, pp. 1078-1113 (36 pages).
Tiseo et al., "A Shape Memory Alloy Based Tuneable Dynamic Vibration Absorber for Vibration Tonal Control", Journal of Theoretical and Applied Mechanics, 2010, pp. 135-153 (19 pages).
Williams et al., "Dynamic modelling of a shape memory alloy adaptive tuned vibration absorber", Elsevier, Journal of Vibration and Sound, 2005, pp. 211-234 (24 pages).
Araki et al., "Integrated mechanical and material design of quasi-zero-stiffness vibration isolator with superelastic Cu—Al—Mn shape memory alloy bars", Journal of Sound and Vibration, 2015 (34 pages).
Casciati et al., "Performance of a base isolator with shape memory alloy bars", Earthquake Engineering and Engineering Vibration, Dec. 2007 (8 pages).
Correa et al., "Mechanical Design of Negative Stiffness Honeycomb Materials", Integrating Materials and Manufacturing Innovation, 4:10, pp. 1-11, 2015 (11 pages).
Ferguson-Pell, "Seat Cushion Selection", J. Rehab. Res. Dev., Special Supplement #2, 23(3), pp. 49-73, 1986 (25 pages).
Miga Motor Company, "Miga Adrenaline—A Space Age Wire," retrieved from the Internet: <https://migamotors.com/index.php?main_page=product_info&cPath=1&products_id=37>, [retrieved Mar. 26, 2021] (1 page).
Furukawa Techno Material, "Shape Memory Alloys & Super-elastic Alloys," retrieved from the Internet: <https://www.furukawa-ftm.com/english/nt-e/product.htm>, [retrieved Mar. 26, 2021] (3 pages).
Edragon Technology Corporation, "What is Electrostatic Chuck?" retrieved from the Internet: <https://edragoncorp.weebly.com/what-is-electrostatic-chuck.html>, 2014 (8 pages).
Strittmatter et al., "Intelligent materials in modern production—Current trends for thermal shape memory alloys," Procedia Manufacturing, vol. 30, pp. 347-356, 2019 (10 pages).
Shunk, "GM awarded DOE money to research Shape Memory Alloy heat engines," dated Nov. 2, 2009, retrieved from the Internet: <https://www.autoblog.com/2009/11/02/gm-awarded-doe-money-to-research-shape-memory-alloy-heat-engines/>, [retrieved Mar. 26, 2021] (2 pages).
Gummin, "Shape Memory Alloy Massage for Seating Surfaces," dated Jun. 15, 2018, retrieved from the Internet: <https://contest.techbriefs.com/2018/entries/consumer-products/8871> (3 pages).
Stoeckel, "Shape Memory Actuators for Automotive Applications," Materials & Design. vol. 11, No. 6, pp. 302-307, Dec. 1990 (6 pages).
Katayama et al., "Shape Memory Alloy Wire Actuated Hinge Mechanism for Deploying Segmented Plates," Bulletin of Osaka Prefecture University, Series A, vol. 45, No. 2, 1996, pp. 119-124 (8 pages).
Rowe et al., U.S. Appl. No. 63/485,398, filed Feb. 16, 2023.
Barbarino et al., "A review on shape memory alloys with applications to morphing aircraft", Smart Materials and Structures, Apr. 2014 (19 pages).
"HapWRAP: Soft Growing Wearable Haptic Device", retrieved from the Internet: <https://smartdevicess.createdsites.com>, dated May 27, 2019 (18 pages).
Yilmaz et al., "Detecting Vital Signs with Wearable Wireless Sensors", Sensors, Dec. 2010 (26 pages).
Choi et al. "Highly conductive, stretchable, and biocompatible Ag—Au core-sheath nanowire composite for wearable and implantable bioelectronics", Nature Nanotechnology 13, No. 11, 2018 (36 pages).
Gao et al., "Wearable Microfluidic Diaphragm Pressure Sensor for Health and Tactile Touch Monitoring", Advanced Materials, Oct. 2017 (15 pages).
Kweon et al., "Wearable high-performance pressure sensors based on three-dimensional electrospun conductive nanofibers", NPG Asia Materials 2018 (12 pages).
Wang et al. "Monitoring of the central blood pressure waveform via a conformal ultrasonic device", Nat Biomed Eng, Sep. 2018 (22 pages).
Agharese et al. "hapWRAP: Soft Growing Wearable Haptic Device", 2018 IEEE International Conference on Robotics and Automation (ICRA), May 2018 (7 pages).
Gao et al., "Fully integrated wearable sensor arrays for multiplexed in situ perspiration analysis", Nature, Jan. 2016 (30 pages).
Jitosho et al. "Exploiting Bistability for High Force Density Reflexive Gripping", 2019 International Conference on Robotics and Automation (ICRA), May 2019 (7 pages).
Wikipedia, "Slap bracelet", retrieved from the Internet: <https://en.wikipedia.org/wiki/Slap_bracelet>, [retrieved Mar. 12, 2021] (2 pages).
Maffiodo et al. "Three-Fingered Gripper with Flexure Hinges Actuated by Shape Memory Alloy Wires", Int. J. of AutomationTechnology, vol. 11, No. 3, pp. 355-360, 2017 (6 pages).
Buckner et al. "Roboticizing fabric by integrating functional fibers", Proceedings of the National Academy of Sciences, Oct. 2020 (10 pages).
Blain, "Refrigerants not required: Flexible metal cooling prototype demonstrates extreme efficiency", retrieved from the Internet: <https://newatlas.com/shape-memory-alloy-nitinol-heating-cooling/58837/> [retrieved Apr. 1, 2024], dated Mar. 13, 2019 (13 pages).
Taniguchi, "Flexible Artificial Muscle Actuator Using Coiled Shape Memory Alloy Wires", APCBEE Procedia 7, pp. 54-59, May 2013 (6 pages).
Acome et al., "Hydraulically amplified self-healing electrostatic actuators with muscle-like performance", Science 359, pp. 61-65, 2018 (5 pages).
Wang et al., "Recent Progress in Artificial Muscles for Interactive Soft Robotics", Advanced Materials, vol. 33, Issue 19, published Oct. 27, 2020 (48 pages).
Liang et al., "Comparative study of robotic artificial actuators and biological muscle", Advances in Mechanical Engineering, 2020 (25 pages).
El-Atab et al., "Soft Actuators for Soft Robotic Applications: A Review", Advanced Intelligent Systems 2020 (37 pages).
Pagoli et al., "Review of soft fluidic actuators: classification and materials modeling analysis", Smart Materials and Structures, vol. 31, 2021 (31 pages).

(56) References Cited

OTHER PUBLICATIONS

Park et al., "A Novel Fabric Muscle Based on Shape Memory Alloy Springs", Soft Robotics, vol. 7, No. 3, 2020 (11 pages).
Ebay, "Cardboard Dividers 5 Sets 7.5" X 10.5" X 4" High 12 cell", retrieved from the Internet: < https://www.ebay.comitm/175101454003var=0&mkevt=1&mkcid=1&mkrid=711-53200-19255-0&campid=5337076261&toolid=10049&customid=ACF63RFK9J675c23041e8b13f9c32042ed51988cf3> [retrieved Jan. 20, 2022](1 page).
Cazottes et al., "Bistable Buckled Beam: Modeling of Actuating Force and Experimental Validations", Journal of Mechanical Design, 2009 (10 pages).
Cazottes et al., "Design of Actuation for Bistable Structures Using Smart Materials," Advances in Science and Technology, vol. 54, pp. 287-292, 2008 (1st Page/Abstract only).
Cazottes et al., "Actuation of bistable buckled beams with Macro-Fiber Composites," IEEE/RSJ International Conference on Intelligent Robots and Systems, pp. 564-569, 2008 (7 pages).
Haines et al., "New Twist on Artificial Muscles," Proceedings of the National Academy of Sciences, vol. 113, No. 42, pp. 11709-11716, Oct. 18, 2016 (9 pages).
Inoue et al., "High-performance structure of a coil-shaped soft-actuator consisting of polymer threads and carbon nanotube yarns," AIP Advances 8, 2018, (8 pages).
Abbas et al., "A Physics Based Model for Twisted and Coiled Actuator" 2017 IEEE International Conference on Robotics and Automation (ICRA), pp. 6121-6126, 2017 (6 pages).
Haines et al., "Artificial Muscles from Fishing Line and Sewing Thread" (Supplementary Materials) Science 343, 868, 2014 (36 pages).
Yip et al., "On the Control and Properties of Supercoiled Polymer Artificial Muscles," IEEE Transactions on Robotics 2017 (11 pages).
alibaba.com, "Hangzhou Phase Change Technology Co., Ltd", Retrieved from the Internet: < https://hzfeijie.en.alibaba.com/product/1448845650-220286736/phase_change_material_PCM_balls.html#!>, [Retrieved May 2, 2017] (3 pages).
Goodfellow Corporation, "New to Our Range: A Magnetic Shape Memory Alloy that Converts Magnetic Field Energy into Kinetic Energy," <retrieved from the Internet: http://www.goodfellowusa.com/corporate/news/US/June-2011/us.htm> [retrieved Jan. 23, 2012] (2 pages).
Goodfellow Corporation, "Magnetic Shape Memory Material", <retrieved from the Internet: http://www.goodfellowusa.com/larger-quantities/alloys/magnetic-shape-memory-material/> [retrieved Jan. 23, 2012] (3 pages).
Sherrit et al., "Planar Rotary Motor using Ultrasonic Horns", Proc. SPIE 7981, Sensors and Smart Structures Technologies for Civil, Mechanical, and Aerospace Systems 2011, 79810O, Apr. 13, 2011 (8 pages).
Henry, "Dynamic Actuation Properties of Ni—Mn—Ga Ferromagnetic Shape Memory Alloys", submitted to the Massachusetts Institute of Technology Department of Materials Science and Engineering on May 22, 2002, images on pp. 64-66 (202 pages).
Zhu et al., U.S. Appl. No. 18/433,896, filed Feb. 6, 2024.
Rowe et al., U.S. Appl. No. 18/468,029, filed Sep. 15, 2023.
Zhu et al., U.S. Appl. No. 18/399,075, filed Dec. 28, 2023.
Rowe et al., U.S. Appl. No. 18/178,302, filed Mar. 3, 2023.
Rowe et al., U.S. Appl. No. 18/399,026, filed Dec. 28, 2023.
International Search Report and Written Opinion for International Application No. PCT/US2024/014926 mailed on May 29, 2024 (11 pages).
Williams et al., U.S. Appl. No. 18/738,516, filed on Jun. 10, 2024.
Song et al., "Resistance Modelling of SMA Wire Actuators", Canadian Institute for NDE, International Workshop: Smart Materials, Structures & NDT in Aerospace Conference, Nov. 2011 (10 pages).
Rowe et al., U.S. Appl. No. 18/452,602, filed on Aug. 21, 2023.
Motzki, "Efficient SMA Actuation—Design and Control Concepts", Proceedings, vol. 64, No. 1, MDPI, 2020 (9 pages).
Arduino Documentation, "Secrets of Arduino PWM", last revision May 27, 2024, retrieved from the Internet: <https://docs.arduino.cc/tutorials/generic/secrets-of-arduino-pwm/>, [retrieved Jun. 1, 2024] (13 pages).
Spiess, "#321 7 Sensors tested: Measuring Current with Microcontrollers (Arduino, ESP32, ESP8266)", uploaded on Apr. 5, 2020 by user "Andreas Spiess" accessible via the Internet: <https://www.youtube.com/watch?v=cG8moaufmQs>.

\* cited by examiner

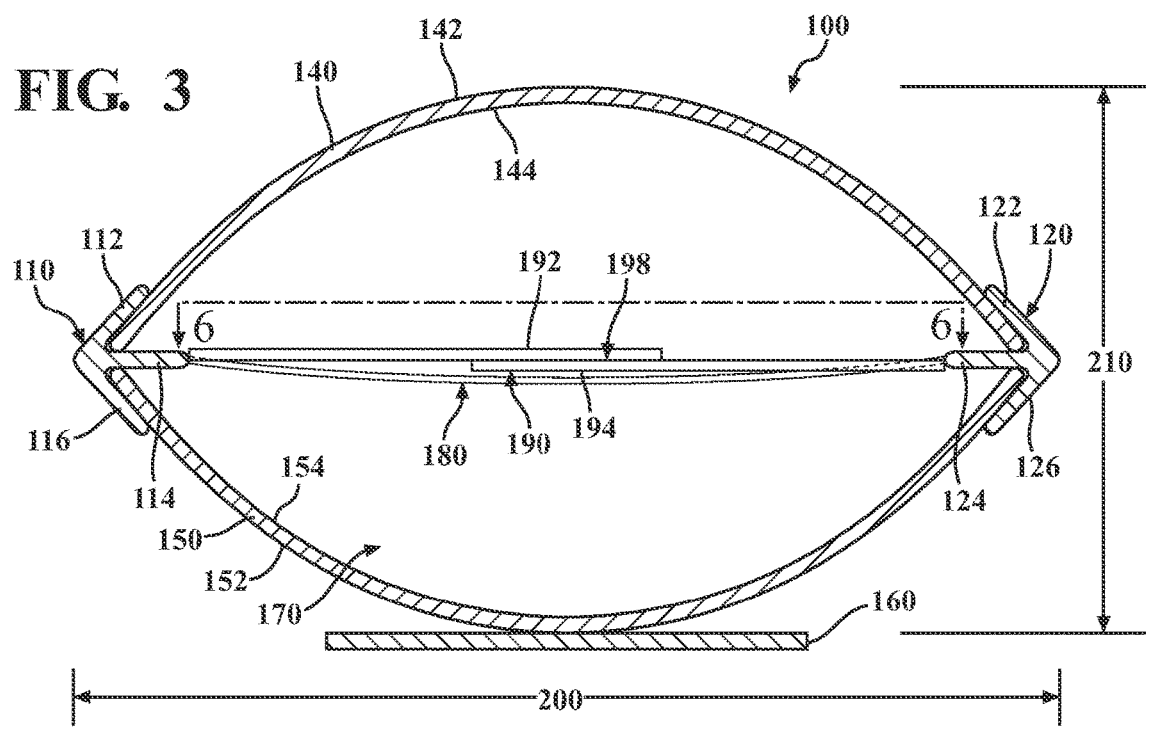

SHAPE MEMORY MATERIAL MEMBER-BASED ACTUATOR WITH ELECTROSTATIC CLUTCH PRELIMINARY CLASS

FIELD

The subject matter described herein relates in general to actuators and, more particularly, to actuators that use shape memory material members.

BACKGROUND

Shape memory alloys change shape when an activation input is provided to the material. When the activation input is discontinued, the material can return to its original shape. To maintain the activated shape of the shape memory alloy, the activation input must be continuously provided.

SUMMARY

In one respect, the present disclosure is directed to an actuator. The actuator can include one or more actuator body members. The actuator can include one or more shape memory material members and an electrostatic clutch. The one or more shape memory material members and the electrostatic clutch can be operatively connected to at least one of the one or more actuator body members. When an activation input is provided to the one or more shape memory material members, the one or more shape memory material members can contract. This contraction can cause the actuator to morph into an activated configuration in which a height of the actuator increases. The electrostatic clutch can be configured to maintain the actuator in the activated configuration when the activation input to the one or more shape memory material members is discontinued.

In another respect, the present disclosure is directed to a system. The system can include an actuator that has one or more shape memory material members and an electrostatic clutch. The system can include one or more processors operatively connected to selectively and independently activate the one or more shape memory material members and the electrostatic clutch. When an activation input is provided to the one or more shape memory material members, the one or more shape memory material members can contract, which, it turn, causes the actuator to morph into an activated configuration in which a height of the actuator increases. The electrostatic clutch can be configured to maintain the actuator in the activated configuration when the activation input to the one or more shape memory material members is discontinued.

In still another respect, the present disclosure is directed to an actuation method for an actuator. The actuator can include one or more shape memory material members and an electrostatic clutch. The method can include activating the one or more shape memory material members to cause the one or more shape memory material members to contract, thereby causing the actuator to morph into an activated configuration. Thus, a height of the actuator increases. The method can include activating the electrostatic clutch while the actuator is in the activated configuration. The method can include deactivating the one or more shape memory material members, whereby the actuator is maintained in the activated configuration by the electrostatic clutch.

BRIEF DESCRIPTION OF THE DRAWINGS

FIG. 3 is a cross-sectional view of the actuator of FIG. 2, showing a maintained activated condition.

FIG. 4 is a cross-sectional plan view of the actuator of FIG. 1.

DETAILED DESCRIPTION

Figure 1:
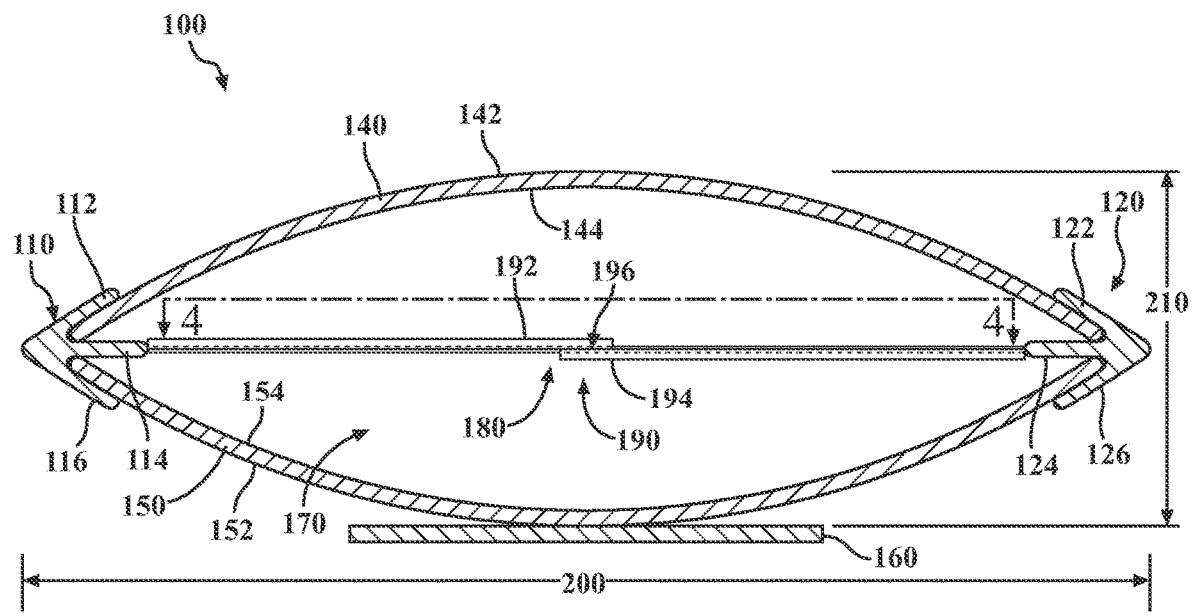
FIG. 1 is a cross-sectional view of an example of an actuator, showing a non-activated condition.

The energy consumption to maintain a shape memory alloy in an activated state is often prohibitively large for many applications. Further, when an activation input to the shape memory alloy is discontinued, it takes a relatively long period of time for the shape memory alloy to sufficiently cool down to return to its original state. This process may not be fast enough for many applications.

Accordingly, arrangement described herein are directed to, among other things, an actuator. The actuator can include one or more shape memory material members and an electrostatic clutch. When an activation input is provided to the one or more shape memory material members, the one or more shape memory material members can contract, thereby causing the actuator to morph into an activated configuration in which a height of the actuator increases. The electrostatic clutch being configured to maintain the actuator in the activated configuration when the activation input to the one or more shape memory material members is discontinued.

Thus, a high actuation force/torque can be provided by the shape memory material member(s), and the activated configuration of the actuator can be maintained at low energy consumption level by the electrostatic clutch.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Arrangements described herein are directed to an actuator. Generally, the actuator can include one or more shape memory material members and an electrostatic clutch. The actuator can have any suitable form. One example of an actuator will be described herein. However, it will be understood this example is not intended to be limiting. Indeed, there are numerous actuator designs that include one or more shape memory material members and an electrostatic clutch and that can be operated according to actuation schemes described herein.

Referring to FIGS. 1-6, an example of an actuator 100 is shown. The actuator 100 can have any suitable configuration. The actuator 100 can include one or more actuator body members. For instance, the actuator 100 can include a first endcap 110 and a second endcap 120. The first endcap 110 and the second endcap 120 can be spaced apart. The first endcap 110 and the second endcap 120 can face toward each other.

The first endcap 110 and the second endcap 120 can have any suitable size, shape, and/or configuration. In one or more arrangements, the first endcap 110 and the second endcap 120 can be substantially mirror images of each other. In one or more arrangements, the first endcap 110 can have three prongs, including an upper prong 112, a middle prong 114, and a lower prong 116. Similarly, the second endcap 120 can have three prongs, including an upper prong 122, a middle prong 124, and a lower prong 126.

The first endcap 110 and the second endcap 120 can be made of any suitable material. The first endcap 110 and the second endcap 120 can be substantially rigid structures. In some arrangements, the prongs 112, 114, 116, 122, 124, 126 of the first and second endcaps 110, 120 can be flexible to accommodate changes to the actuator 100 when activated and deactivated. The first and second endcaps 110, 120 can be oriented such that the middle prong 114 of the first endcap 110 is substantially aligned with the middle prong 124 of the second endcap 120.

The actuator 100 can include a first outer member 140. The first outer member 140 can have a bowed shape. The first outer member 140 can have a convex side 142 and a concave side 144. In some arrangements, the first outer member 140 can be made of a single piece of material. In other arrangements, the first outer member 140 can be made of a plurality of pieces of material. In some arrangements, the first outer member 140 can be made of a plurality of layers. The first endcap 110 and the second endcap 120 can be made of any suitable material. In some arrangements, the first outer member 140 can be made of a flexible to accommodate changes to the actuator 100 when activated and deactivated.

The first outer member 140 can be operatively connected to the first endcap 110 and the second endcap 120. For instance, the first outer member 140 can be operatively connected to the upper prong 112 of the first endcap 110 and to the upper prong 122 of the second endcap 120. Any suitable manner of operative connection can be provided, such as one or more fasteners, one or more adhesives, one or more welds, one or more brazes, one or more forms of mechanical engagement, or any combination thereof. In some arrangements, one or more portions of the first outer member 140, such as the ends, can be operatively connected to the middle prong 114 of the first endcap 110 and the middle prong 124 of the second endcap 120.

The actuator 100 can include a second outer member 150. The second outer member 150 can have a bowed shape. The second outer member 150 can have a convex side 152 and a concave side 154. In some arrangements, the second outer member 150 can be made of a single piece of material. In other arrangements, the second outer member 150 can be made of a plurality of pieces of material. In some arrangements, the second outer member 150 can be made of a plurality of layers. The first endcap 110 and the second endcap 120 can be made of any suitable material. In some arrangements, the second outer member 150 can be made of a flexible to accommodate changes to the actuator 100 when activated and deactivated.

In some arrangements, the actuator 100 can include a base 160. The base 160 can provide stability to the actuator 100. In some arrangements, the base 160 can be operatively connected to the convex side 152 of the second outer member 150. Any suitable manner of operative connection can be provided, such as one or more fasteners, one or more adhesives, one or more welds, one or more brazes, one or more forms of mechanical engagement, or any combination thereof. In other arrangements, the base 160 and the second outer member 150 can be formed together as a unitary structure. The base 160 can have any suitable size, shape, and/or configuration. The base 160 can be a substantially flat structure. In one or more arrangements, the base 160 can be substantially rectangular. In some arrangements, the base 160 can be configured as a cradle into which the actuator 100 (e.g., the second outer member 150) can be received. The base 160 can be made of any suitable material. The base 160 can be made of the same material as the second outer member 150, or the base 160 can be made of a different material.

The second outer member 150 can be operatively connected to the first endcap 110 and the second endcap 120. For instance, the second outer member 150 can be operatively connected to the lower prong 116 of the first endcap 110 and to the lower prong 126 of the second endcap 120. Any suitable manner of operative connection can be provided, such as one or more fasteners, one or more adhesives, one or more welds, one or more brazes, one or more forms of mechanical engagement, or any combination thereof. In some arrangements, one or more portions of the second outer member 150, such as the ends, can be operatively connected to the middle prong 114 of the first endcap 110 and the middle prong 124 of the second endcap 120.

The first outer member 140 and the second outer member 150 can be composed of or include a substantially flexible material. The first outer member 140 and the second outer member 150 can be reversibly deformed, such that the first outer member 140 and the second outer member 150 will not be damaged during the deformation. Damage can include cracking, breaking, fracturing, or other forms of inelastic deformation. In some implementations, the flexible material is a flexible polymer. Specific examples of flexible polymers which can be used various implementations include rubber (including natural rubber, styrene-butadiene, polybutadiene, neoprene, ethylene-propylene, butyl, nitrile, silicone), polycarbonates, acrylic, polyesters, polyethylenes, polypropylenes, nylon, polyvinyl chlorides, polystyrenes, elastomers, polyolefins, and others flexible polymers known to persons skilled in the art. In some implementations, the flexible material can be exposed to a degree of stretch selected in the range of about 1% to about 1300%, such as about 10% to about 1300%, or about 100% to about 1300% without resulting in mechanical failure (e.g., tearing, cracking, or inelastic deformation). In further implementations, the flexible material can be deformed to a radius of curvature selected in the range of 100 micrometers (μm) to 3 meters (m) without mechanical failure.

The first outer member 140 and the second outer member 150 can be oriented such that their concave sides 144, 154 face each other. The first outer member 140 and the second outer member 150 can define a cavity 170.

The actuator 100 can include one or more shape memory material members 180. The shape memory material members 180 can be operatively connected to the first endcap 110 and the second endcap 120. More particularly, the shape memory material member 180 can be operatively connected to the middle prong 114 of the first endcap 110 and the middle prong 124 of the second endcap 120. Any suitable manner of operative connection can be provided, such as one or more fasteners, one or more adhesives, one or more welds, one or more brazes, one or more forms of mechanical engagement, or any combination thereof. The shape memory material member(s) 180 can be located within the cavity 170.

In some arrangements, there can be a single shape memory material member 180. In such case, the shape memory material member 180 can, for example, extend straight across the cavity from the first endcap 110 and the second endcap 120. In another example, the shape memory material member 180 can extend in a zig zag or serpentine pattern between the first endcap 110 and the second endcap 120. In some arrangements, the first endcap 110 and the second endcap 120 can be configured to allow the shape memory material member 180 to turn around and extend in the opposite direction. As an example, the first endcap 110 and the second endcap 120 can include a plurality of slots to enable such a turnaround of the shape memory material member(s) 180.

In some arrangements, there can be a plurality of shape memory material members 180. In such case, the shape memory material members 180 can be distributed, arranged, and/or oriented in any suitable manner. For instance, the shape memory material members 180 can extend substantially parallel to each other. In other arrangements, one or more of the shape memory material members 180 can extend non-parallel to the other shape memory material members 180. In some instances, some of the plurality of shape memory material members 180 may cross over each other.

The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members 180 can be shape memory material wires. As an example, the shape memory material members 180 can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

The wire(s) can have any suitable characteristics. For instance, the wire(s) can be high temperature wires with austenite finish temperatures from about 80 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The pulling force of SMA wire(s) can be from about 150 MPA to about 400 MPa. The wire(s) can be configured to provide an initial moment of from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material members 180 to be moved from non-activated position to an activated position in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynaolloy, Inc., Irvine, California. As further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature TSMA. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the TSMA to a temperature greater than the TSMA.

Other active materials may be used in connection with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material members 180 are described, in some implementations, as being wires, it will be understood that the shape memory material members 180 are not limited to being wires. Indeed, it is envisioned that suitable shape memory materials may be employed in a variety of other forms, such as sheets, plates, panels, strips, cables, tubes, or combinations thereof. In some arrangements, the shape memory material members 180 may include an insulating coating.

The actuator 100 can include an electrostatic clutch 190. The electrostatic clutch 190 can be any type of electrostatic clutch, now known or later developed. Some examples of an electrostatic clutch are described in U.S. Patent Publ. No. 2021/0265922 and U.S. Pat. No. 10,355,624, which are incorporated herein by reference. One non-limiting example of the electrostatic clutch 190 is shown in FIGS. 1-6.

The electrostatic clutch 190 can include a first electrode 192 and a second electrode 194. The first electrode 192 and the second electrode 194 can be made of any suitable material. For instance, the first electrode 192 and the second electrode 194 can include a conductive material. In some arrangements, the first electrode 192 and the second electrode 194 can include a plurality of layers. As a non-limiting example, the first electrode 192 and/or the second electrode 194 can include three layers. For instance, the first electrode 192 and/or the second electrode 194 can include a base layer, which can be polyester, other polymer, composite, etc. A metallic layer can be coated or otherwise applied on the base layer. In some arrangements, the metallic layer can include aluminum or other conductor. A dielectric layer can be coated on top of the metallic layer. Thus, the metallic layer can be located between the base layer and the dielectric layer. The dielectric layer can be made of any suitable dielectric material. In one or more arrangements, the dielectric layer can be made of a high dielectric polymer (e.g., a minimum dielectric constant of at least 20).

The first electrode 192 and the second electrode 194 can be made of a flexible material and/or a conforming material. As will be described herein, the first electrode 192 and the second electrode 194 can move when the electrostatic clutch 190 is activated. Also, when the electrostatic clutch 190 is activated, the first electrode 192 and the second electrode 194 can conform to each other so that there is a good interface between them.

The first electrode 192 and the second electrode 194 can have any suitable size, shape, and/or configuration. In one or more arrangements, the first electrode 192 and the second electrode 194 can be substantially rectangular. In some arrangements, the first electrode 192 and the second electrode 194 can be substantially identical to each other. In other arrangements, the first electrode 192 and the second electrode 194 can be different from each other in one or more respects.

The first electrode 192 can be operatively connected to the first endcap 110. More particularly, the first electrode 192 can be operatively connected to the middle prong 114 of the first endcap 110. The first electrode 192 can be operatively connected to the first endcap 110 in any suitable manner, now known or later developed. For instance, the first electrode 192 can be operatively connected to the first endcap 110 by one or more fasteners, one or more adhesives, one or more welds, one or more brazes, one or more forms of mechanical engagement, and/or any combination thereof, just to name a few possibilities. The first electrode 192 can extend from the first endcap 110 in a direction toward the second endcap 120. The first electrode 192 can extend cantilevered from the first endcap 110.

The second electrode 194 can be operatively connected to the second endcap 120. More particularly, the second electrode 194 can be operatively connected to the middle prong 124 of the second endcap 120. The second electrode 194 can be operatively connected to the second endcap 120 in any suitable manner, now known or later developed. For instance, the second electrode 194 can be operatively connected to the second endcap 120 by one or more fasteners, one or more adhesives, one or more welds, one or more brazes, one or more forms of mechanical engagement, and/or any combination thereof, just to name a few possibilities. The second electrode 194 can extend from the second endcap 120 in a direction toward the first endcap 110. The second electrode 194 can extend cantilevered from the second endcap 120.

The first electrode 192 and the second electrode 194 can be substantially parallel to each other. The first electrode 192 and the second electrode 194 are configured to slide relative to each other. For example, when the actuator 100 is in a non-activated condition, the first electrode 192 and the second electrode 194 can overlap each other in a first area 196. When the actuator 100 is in an activated condition or in the maintained activated condition, the first electrode 192 and the second electrode 194 can overlap each other in a second area 198. The second area 198 can be greater than the first area 196. Thus, the amount of overlap between the first electrode 192 and the second electrode 194 can increase when going from the non-activated condition to the activated condition.

In some arrangements, the overlapping portions of the first electrode 192 and the second electrode 194 can be adjacent to each other. The overlapping portions of the first electrode 192 and the second electrode 194 can contact each other. In some arrangements, the overlapping portions of the first electrode 192 and the second electrode 194 can be spaced from each other in an elevational direction. The spacing can be small, such as about 0.25 inches or less, about 0.125 inches or less, about 0.0625 inches or less, or even smaller.

The electrostatic clutch 190 can be activated by supplying electrical energy to the first electrode 192 and the second electrode 194. The first electrode 192 and the second electrode 194 can become oppositely charged. The first electrode 192 and the second electrode 194 can become electrostatically attracted to each other. Given their close proximity, the overlapping surfaces of the first electrode 192 and the second electrode 194 can become connected to each other due to the electrostatic forces. As a result, the first electrode 192 and the second electrode 194 do not move relative to each other. It will be appreciated that, the larger the area of overlap between the first electrode 192 and the second electrode 194, the higher the electrostatic holding force between them.

There can be any suitable arrangement between the electrostatic clutch 190 and the shape memory material member(s) 180. For instance, the electrostatic clutch 190 and the shape memory material member(s) 180 can be substantially parallel to each other. In some arrangements, the electrostatic clutch 190 and the shape memory material member(s) 180 can be located substantially within the same plane or at substantially the same elevation. In some arrangements, the electrostatic clutch 190 and the shape memory material member(s) 180 can be arranged in different planes. In some arrangements, there can be a plurality of electrostatic clutches 190. In one or more arrangements, there can be two electrostatic clutches 190, as shown in FIGS. 1-6. The two electrostatic clutches 190 can be located in substantially the same plane as the shape memory material member(s) 180 or at substantially the same elevation. Moreover, the two electrostatic clutches 190 can be located on opposite outboard sides of the shape memory material member(s) 180. However, it will be appreciated that arrangements described herein are not limited to such a configuration.

The actuator 100 can include a first dimension 200 and the second dimension 210. The first dimension 200 can describe a width of the actuator 100, and the second dimension 210 can describe a height of the actuator 100. The first dimension 200 and the second dimension 210 can be substantially perpendicular to each other.

Various operational configurations of the actuator 100 will now be described. These operational configurations include a non-activated condition, an activated condition, and a maintained activated condition.

FIGS. 1 and 4 show an example of the actuator 100 in a non-activated condition. Here, neither the shape memory material member(s) 180 nor the electrostatic clutch 190 are activated. The first electrode 192 and the second electrode 194 of each electrostatic clutch 190 can partially overlap each other, as shown. The shape memory material member(s) 180 can be taut or slightly slack.

Figure 2:
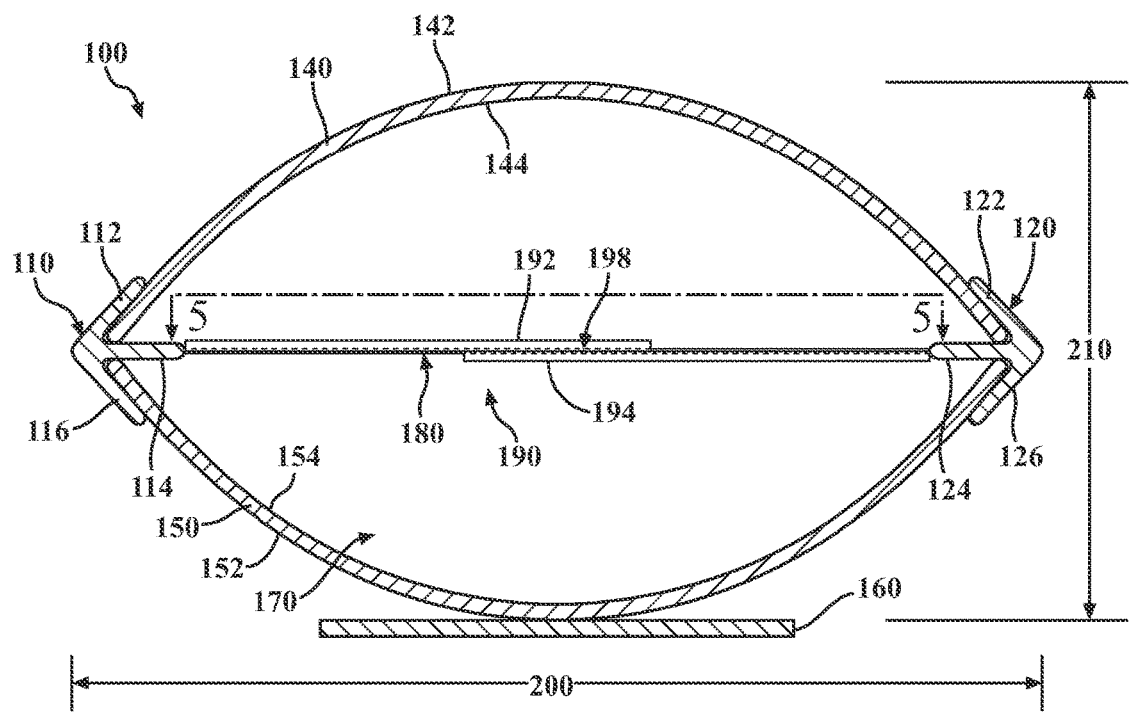
FIG. 2 is a cross-sectional view of the actuator of FIG. 1, showing an activated condition.
Figure 5:
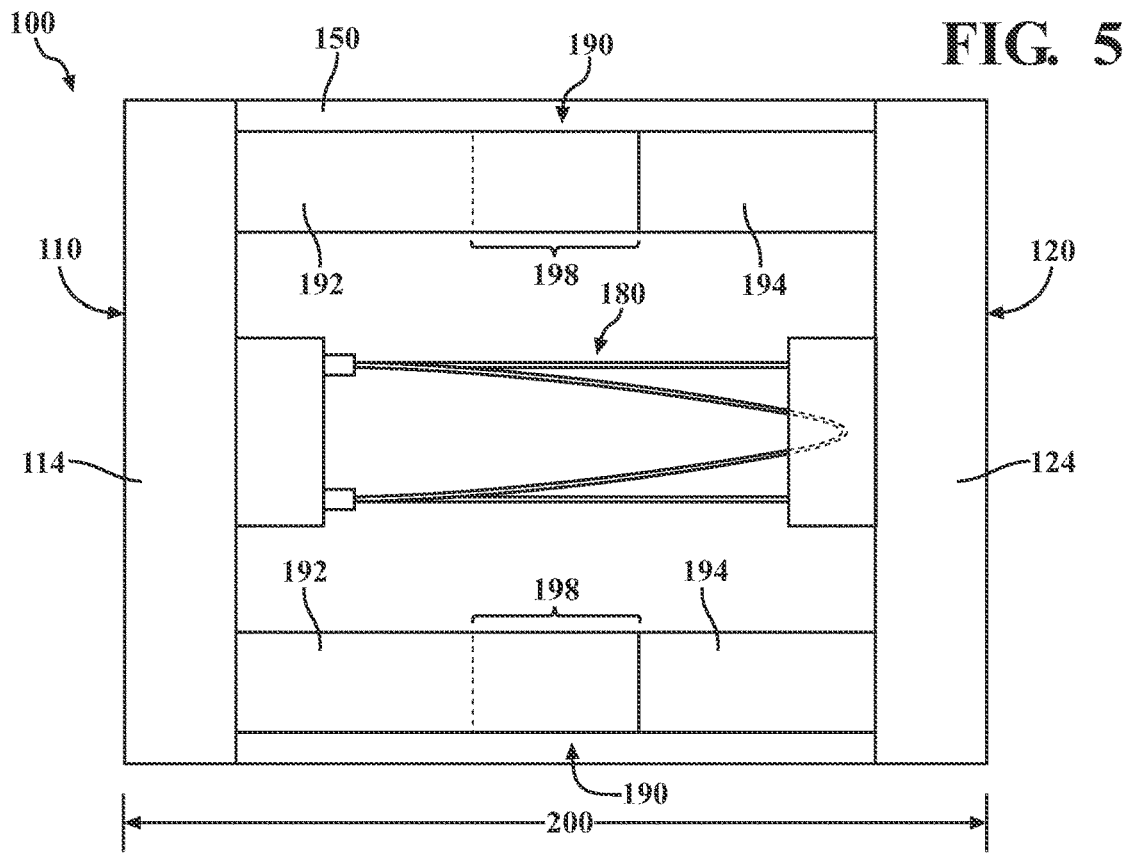
FIG. 5 is a cross-sectional plan view of the actuator of FIG. 2

FIGS. 2 and 5 show an example of the actuator 100 in an activated condition. When an activation input (e.g., electrical energy) is provided to the shape memory material member(s) 180, the shape memory material member(s) 180 can contract. This contraction causes the shape memory material member(s) 180 to pull the first endcap 110 and the second endcap 120 toward each other in a direction that corresponds to the first dimension 200.

Consequently, the ends of the first outer member 140 can be drawn toward each other in a direction that corresponds to the first dimension 200, and the ends of the second outer member 150 can be drawn toward each other in a direction that corresponds to the first dimension 200. As a result, the first outer member 140 and the second outer member 150 can bow outward and away from each other in a direction that corresponds to the second dimension 210. It will be appreciated that, in going from the non-activated condition to the activated condition, the first dimension 200 (i.e., the width) of the actuator 100 can decrease, and the second dimension 210 (i.e., the height) of the actuator 100 can increase. Further, the first electrode 192 can be moved toward the second endcap 120, and the second electrode 194 can be moved toward the first endcap 110. As a result, the amount of overlap between the first electrode 192 and the second electrode 194 can increase.

Figure 6:
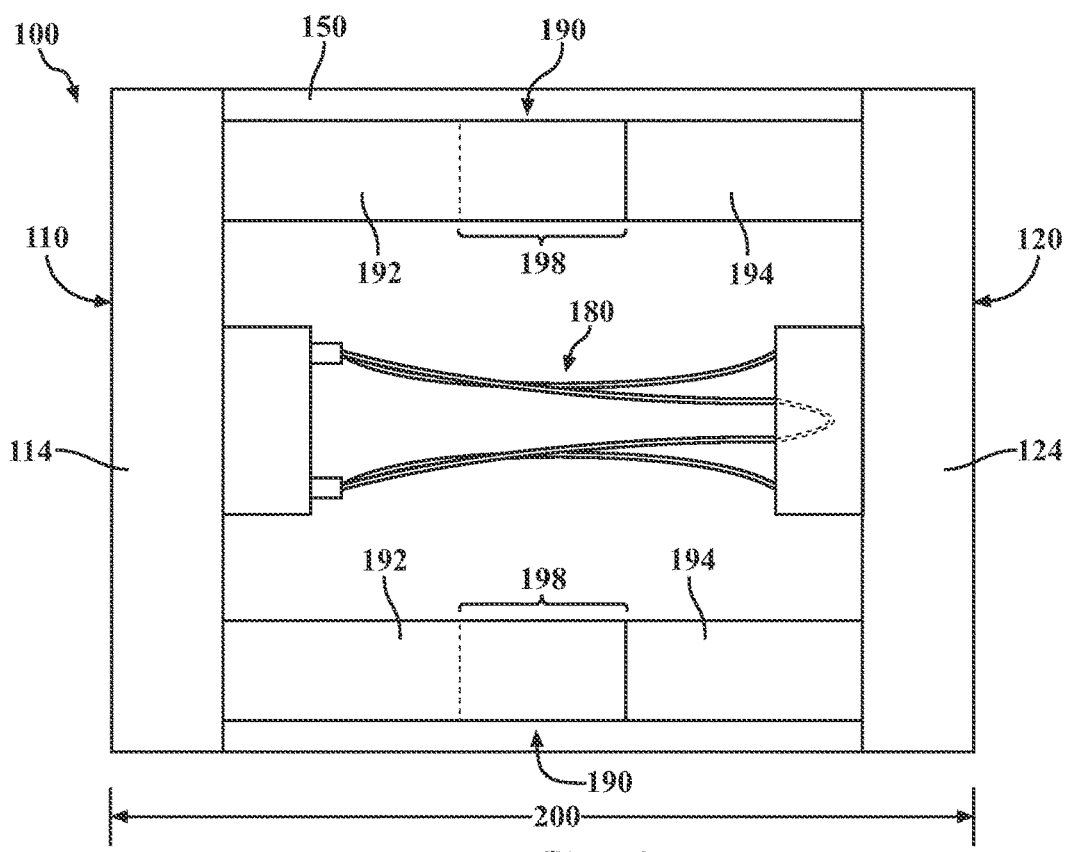
FIG. 6 is a cross-sectional plan view of the actuator of FIG. 3.

FIGS. 3 and 6 show an example of the actuator 100 in a maintained activated condition. The electrostatic clutch 190 can be activated, such as by supplying electrical energy to the first electrode 192 and the second electrode 194. As a result, the first electrode 192 and the second electrode 194 can become electrostatically connected to each other.

After the electrostatic clutch 190 is activated, the activation input to the shape memory material member(s) 180 can be discontinued. Thus, the supply of electrical energy to the shape memory material member(s) 180 can be stopped. The shape memory material member(s) 180 can begin to cool and will expand. However, the activated condition of the actuator 100 can be maintained due to the electrostatic connection between the first electrode 192 and the second electrode 194. The electrostatic connection is sufficiently strong to prevent the first electrode 192 and the second electrode 194 from sliding relative to each other and sufficiently strong to maintain the actuator 100 in the activated condition.

It should be noted that while the actuator 100 is in the activated condition and the shape memory material member(s) 180 expand, the shape memory material member(s) 180 may no longer retain a substantially linear configuration. The shape memory material member(s) 180 can become slack and/or warped, as kinks, bens, curves, etc. may develop.

It will be appreciated that the actuator 100 shown in FIGS. 1-6 is merely one example of an actuator that can be used in connection with arrangements described herein. Other actuator configurations are possible. Additional non-limiting examples of actuators with shape memory material members are described in U.S. Pat. Nos. 10,960,793; 11,285,844; and 11,370,330, which are incorporated herein by reference.

Figure 7:
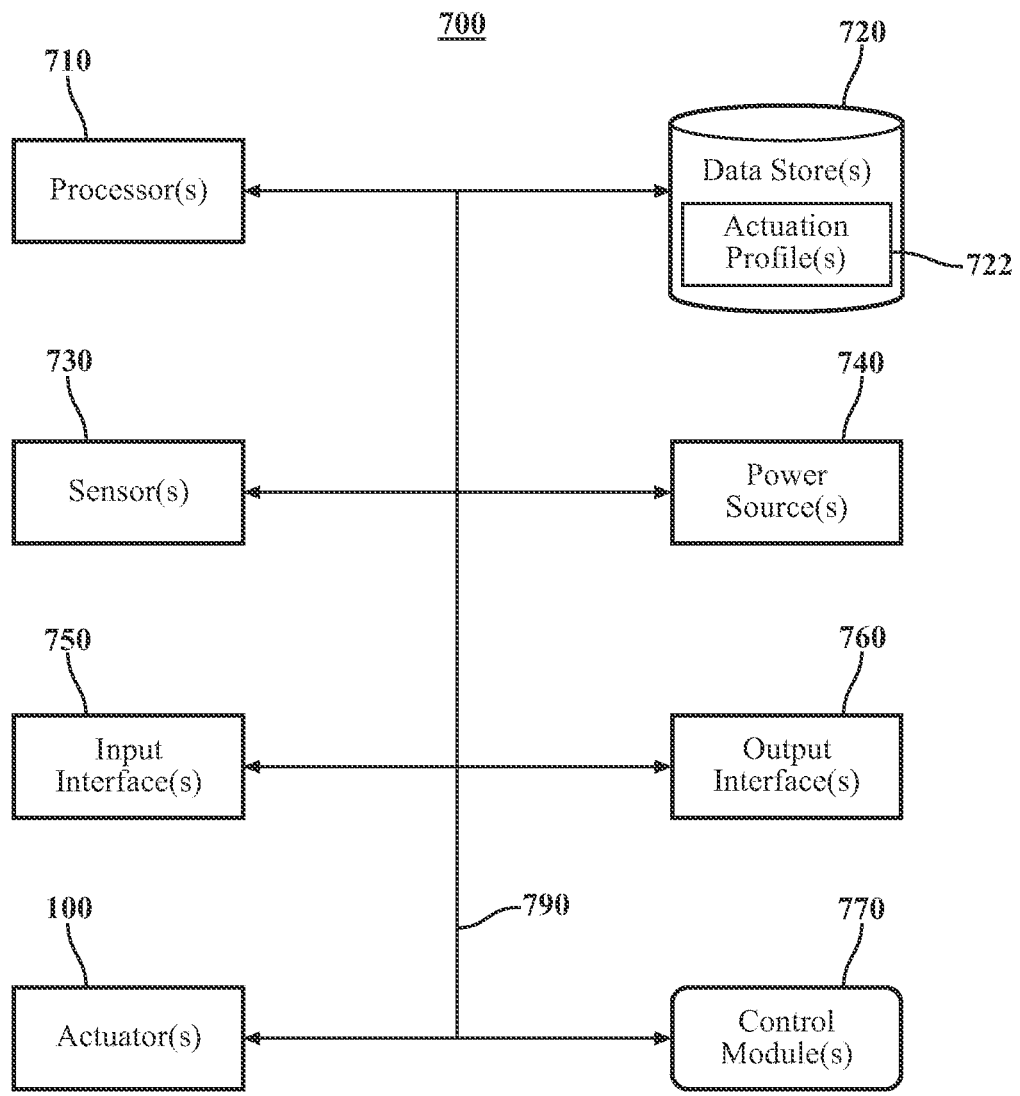
FIG. 7 is an example of an actuator system.

FIG. 7 shows an example of a system 700. The system 700 can include various elements. Some of the possible elements of the system 700 are shown in FIG. 7 and will now be described. It will be understood that it is not necessary for the system 700 to have all of the elements shown in FIG. 7 or described herein. The system 700 can have any combination of the various elements shown in FIG. 7. Further, the system 700 can have additional elements to those shown in FIG. 7. In some arrangements, the system 700 may not include one or more of the elements shown in FIG. 7. Further, the elements shown may be physically separated by large distances.

The system 700 can include one or more processors 710, one or more data stores 720, one or more sensors 730, one or more power sources 740, one or more input interfaces 750, one or more output interfaces 760, one or more of the actuators 100, and one or more control modules 770. Each of these elements will be described in turn below.

As noted above, the system 700 can include one or more processors 710. "Processor" means any component or group of components that are configured to execute any of the processes described herein or any form of instructions to carry out such processes or cause such processes to be performed. The processor(s) 710 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 710 can include at least one hardware circuit (e.g., an integrated circuit) configured to carry out instructions contained in program code. In arrangements in which there is a plurality of processors 710, such processors can work independently from each other, or one or more processors can work in combination with each other.

The system 700 can include one or more data stores 720 for storing one or more types of data. The data store(s) 720 can include volatile and/or non-volatile memory. Examples of suitable data stores 720 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 720 can be a component of the processor(s) 710, or the data store(s) 720 can be operatively connected to the processor(s) 710 for use thereby. The term "operatively connected," as used throughout this description, can include direct or indirect connections, including connections without direct physical contact.

In some arrangements, the data stores 720 can include one or more actuation profiles 722. The actuation profile(s) can be predefined patterns of activation and deactivation of one or more shape memory material members and the electrostatic clutch of the actuators. Some examples of an actuation profile(s) are described herein.

The system 700 can include one or more sensors 730. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 700 includes a plurality of sensors 730, the sensors can work independently from each other. Alternatively, two or more of the sensors can work in combination with each other. In such case, the two or more sensors can form a sensor network. The sensor(s) 730 can be operatively connected to the processor(s) 710, the data store(s) 720, and/or other elements of the system 700 (including any of the elements shown in FIG. 7).

The sensor(s) 730 can include any suitable type of sensor, now known or later developed. In some arrangements, the sensor(s) 730 can include weight sensors. The weight sensors can be any suitable sensor, now known or later developed.

As noted above, the system 700 can include one or more power sources 740. The power source(s) 740 can be any power source capable of and/or configured to energize the shape memory material member(s) 180 and/or the electrostatic clutch 190 of the actuator 100. For example, the power source(s) 740 can include one or more batteries, one or more fuel cells, one or more generators, one or more alternators, one or more solar cells, and combinations thereof.

The system 700 can include one or more input interfaces 750. An "input interface" includes any device, component, system, element or arrangement or groups thereof that enable information/data to be entered into a machine. The input interface(s) 750 can receive an input from a user. Any suitable input interface 750 can be used, including, for example, a keypad, display, touch screen, multi-touch screen, button, joystick, mouse, trackball, microphone and/or combinations thereof.

The system 700 can include one or more output interfaces 760. An "output interface" includes any device, component, system, element or arrangement or groups thereof that enable information/data to be presented to a user. The output interface(s) 760 can present information/data to a user. The output interface(s) 760 can include a display, an earphone, and/or speaker. Some components of the system 700 may serve as both a component of the input interface(s) 750 and a component of the output interface(s) 760.

The system 700 can include one or more of the actuators 100 as described above. The actuators 100 can be operatively connected to one or more of the elements of the system 700.

The system 700 can include one or more modules, at least some of which will be described herein. The modules can be implemented as computer readable program code that, when executed by a processor, implement one or more of the various processes described herein. One or more of the modules can be a component of the processor(s) 710, or one or more of the modules can be executed on and/or distributed among other processing systems to which the processor(s) 710 is operatively connected. The modules can include instructions (e.g., program logic) executable by one or more processor(s) 710. Alternatively or in addition, one or more data stores 720 may contain such instructions.

In one or more arrangements, the modules described herein can include artificial or computational intelligence elements, e.g., neural network, fuzzy logic, or other machine learning algorithms. Further, in one or more arrangements, the modules can be distributed among a plurality of modules. In one or more arrangements, two or more of the modules described herein can be combined into a single module.

The system 700 can include one or more control modules 770. The control module(s) 770 can be configured to receive signals, data, information, and/or other inputs from one or more elements of the system 700. The control module(s) 770 can be configured to analyze these signals, data, information, and/or other inputs. The control module(s) 770 can be configured to select one or more of the actuator(s) 100 to be activated or deactivated to achieve a desired effect. In some arrangements, the control module(s) 770 can be configured to select an appropriate one of the actuation profiles 722 in the data store(s) 720 to effectuate the desired actuation. Alternatively or additionally, the control module(s) 770 can be configured to detect user inputs (e.g., commands) provided on the input interface(s) 750. The control module(s) 770 can be configured to send control signals or commands over a communication network 790 to one or more elements of the system 700, including the actuator(s) 100, the shape memory material member(s) 180, the electrostatic clutch 190, and/or any portion thereof.

The control module(s) 770 can be configured to cause the selected one or more of the actuator(s) 100 to be activated or deactivated by activating or deactivating the respective shape memory material member(s) 180 associated with the selected actuator(s) 100. As used herein, "cause" or "causing" means to make, force, compel, direct, command, instruct, and/or enable an event or action to occur or at least be in a state where such event or action may occur, either in a direct or indirect manner. The control module(s) 770 can selectively provide an activation input to the actuator(s) 100 or, more particularly, to the shape memory material member(s) 180 associated with the selected actuator(s) 100. The control module(s) 770 can selectively permit or prevent the flow of electrical energy from the power source(s) 740.

The control module(s) 770 can be configured to cause the selected one or more of the actuator(s) 100 to be maintained in an activate condition by activating the respective electrostatic clutch 190 associated with the selected actuator(s) 100. The control module(s) 770 can selectively provide an activation input to the electrostatic clutch 190 associated with the selected actuator(s) 100. The control module(s) 770 can selectively permit or prevent the flow of electrical energy from the power source(s) 740. Once the electrostatic clutch 190 is activated, the control module(s) 770 can be configured to deactivate the shape memory material member(s) 180 by discontinuing the activation input. Despite the deactivation of the shape memory material member(s) 180, the actuator(s) 100 can remain in the activated condition due to the electrostatic clutch 190.

The control module(s) 770 can be configured to keep the actuator(s) 100 in the activated condition for as long as needed, such as until a period of time passes, a condition occurs, a user command is provided, etc. It will be appreciated that the amount of power needed to maintain the activated condition of the actuator(s) 100 by the electrostatic clutch 190 can be substantially less than using the shape memory material member(s) 180.

The control module(s) 770 can be configured to deactivate the electrostatic clutch 190. The control module(s) 770 can be configured to cease the supply of electrical energy from the power source(s) to the electrostatic clutch 190. When the electrostatic clutch 190 is deactivated, the electrostatic connection between the first electrode 192 and the second electrode 194 can end, and the first electrode 192 and the second electrode 194 can be free to move relative to each other. The actuator 100 can return or substantially return to the non-activated configuration as the first outer member 140 and the second outer member 150 become relaxed.

The various elements of the system 700 can be communicatively linked to one another or one or more other elements through one or more communication networks 790. As used herein, the term "communicatively linked" can include direct or indirect connections through a communication channel, bus, pathway or another component or system. A "communication network" means one or more components designed to transmit and/or receive information from one source to another. The data store(s) 720 and/or one or more other elements of the system 700 can include and/or execute suitable communication software, which enables the various elements to communicate with each other through the communication network and perform the functions disclosed herein.

The one or more communication networks 790 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Now that the various potential systems, devices, elements and/or components of the actuator 100 and the system 700 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 8:
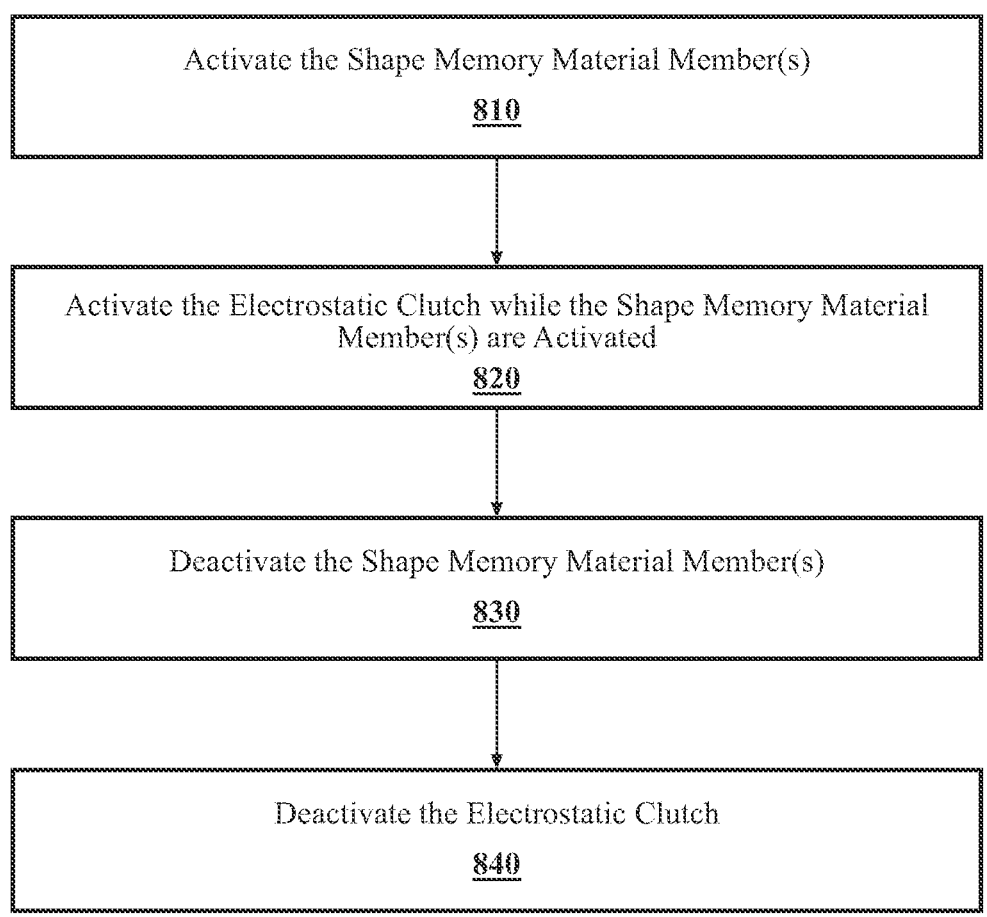
FIG. 8 is an example of an actuation method for the actuator.
Figure 9:
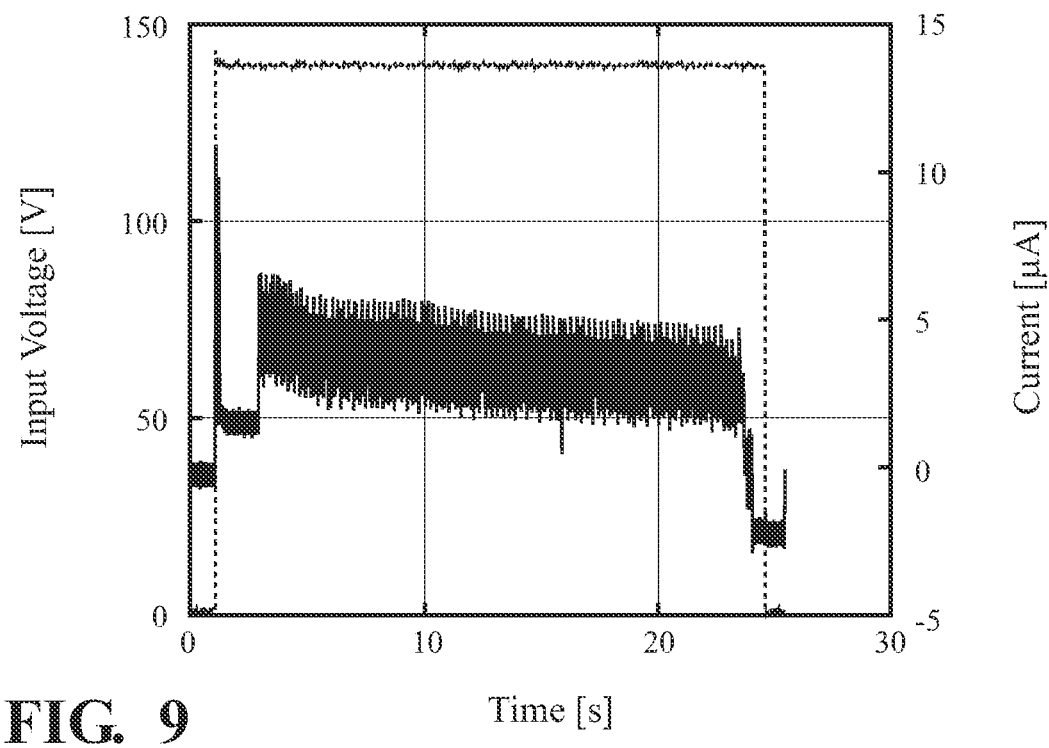
FIG. 9 is a graph of input voltage versus time.
Figure 10:
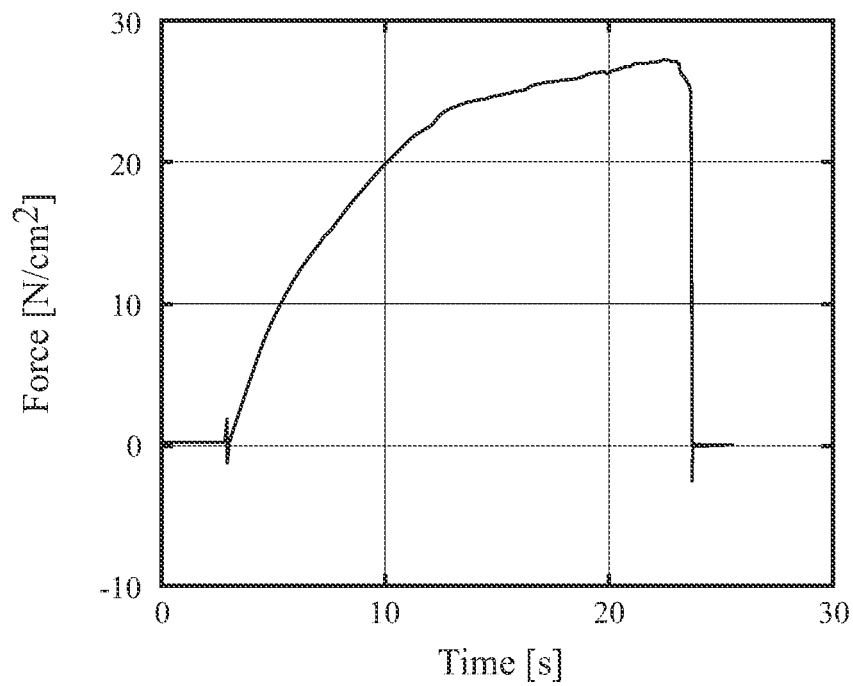
FIG. 10 is an example of a graph of force versus time.

Turning to FIG. 8, an example of a method 800 for actuating the actuator 100 is shown. The actuator can include one or more shape memory material members and an electrostatic clutch. The method 800 can apply to any of the actuators described herein.

At block 810, the shape memory material member(s) can be activated. For instance, the processor(s) 710 and/or the control module(s) 770 can cause electrical energy from the power source(s) 740 to be supplied to the shape memory material member(s). As a result, the shape memory material member(s) can contract. The contraction can cause the actuator to morph into an activated configuration. In the activated configuration, a height of the actuator increases over the non-activated configuration of the actuator. The method 800 can continue to block 820.

At block 820, the electrostatic clutch can be activated while the shape memory material member(s) are activated. For instance, the processor(s) 710 and/or the control module(s) 770 can allow electrical energy from the power source(s) 740 to be supplied to the electrostatic clutch. At this point, the actuator can remain in the activated configuration. The method 800 can continue to block 830.

At block 830, the shape memory material member(s) can be deactivated. For instance, the processor(s) 710 and/or the control module(s) 770 can cause electrical energy from the power source(s) 740 to stop being supplied to the shape memory material member(s). Though the shape memory material member(s) are deactivated, the actuator can be maintained in the activated configuration by the electrostatic clutch. At this point, the shape memory material member(s) can be allowed to cool. The method 800 can continue to block 840.

At block 840, the electrostatic clutch can be deactivated. For instance, the processor(s) 710 and/or the control module(s) 770 can cause electrical energy from the power source(s) 740 to stop being supplied to the electrostatic clutch. As a result, the actuator can substantially return to the non-activated configuration.

The method 800 can end. Alternatively, the method 800 can return to block 810 or to some other block. The method 800 can be repeated at any suitable point, such as at a suitable time or upon the occurrence of any suitable event or condition.

Arrangements described herein can be used in various applications. For instance, arrangements described herein can be used in connection with robotics/exoskeletons, lightweight actuators in vehicles, and seats (e.g., vehicle seats, chairs, gaming chairs, massaging chairs, etc.), just to name a few possibilities.

It will be appreciated that arrangements described herein can provide numerous benefits, including one or more of the benefits mentioned herein. For example, arrangements described herein can provide an actuation scheme that can provide a high actuation force/torque by the shape memory material member(s) and that can maintain the actuation status at low energy consumption level by the assembly and packaging of the electrostatic clutch. Arrangements described herein can reduce energy consumption from shape memory material activation. Arrangements described herein can allow the shape memory material member(s) to dissipate heat and quickly returns to an original state when the electrostatic clutch is disengaged.

With respect to reduced power consumption, SMA wire actuators typically require currents in the range of about 1 to about 20 ampere (A) and voltage in a range of about 1 to about 30 volts (V) depending on wire diameter and length. This results in power consumption on the order of watts (W). In comparison, an electrostatic clutch requires currents in the range of about 1 to about 100 microampere (A) and voltage in the range of about 100 V, resulting in a power consumption in the milliwatt (mW) range, three orders of magnitude lower than required by the SMA wire actuators. For example, the applied voltage, measured current, and measured force of an electrostatic clutch are plotted in FIGS. 9 and 10. The voltage is 140 V, and average current is about 4 microampere under tension, resulting in a power consumption of 0.56 mW.

With respect to the quick return to the original shape, power to the shape memory material member(s) 180 can be immediately turned off after actuation stroke because the final activated condition of the actuator 100 can be maintained by the electrostatic clutch 190. Therefore, cooling of the shape memory material member(s) 180 can begin immediately after the activated condition of the actuator 100 is achieved. Subsequently, the actuator 100 can return or substantially return to its original, non-activated condition by turning off the electrostatic clutch 190. Disengagement of electrostatic clutch typically occurs in less than about 2 seconds.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. An actuator, comprising:
   one or more actuator body members;
   one or more shape memory material members; and
   an electrostatic clutch, the one or more shape memory material members and the electrostatic clutch being operatively connected to at least one of the one or more actuator body members,
   when an activation input is provided to the one or more shape memory material members, the one or more shape memory material members contract, thereby causing the actuator to morph into an activated configuration in which a height of the actuator increases,
   the electrostatic clutch being configured to maintain the actuator in the activated configuration when the activation input to the one or more shape memory material members is discontinued.

2. The actuator of claim 1, wherein the one or more shape memory material members are arranged in a serpentine pattern.

3. The actuator of claim 1, wherein the one or more shape memory material members include one or more shape memory alloy wires.

4. The actuator of claim 1, wherein the electrostatic clutch includes a first electrode and a second electrode, wherein the first electrode and the second electrode are substantially parallel to each other, and wherein the first electrode and the second electrode are configured to slide relative to each other.

5. The actuator of claim 4, wherein, in a non-activated condition, the first electrode and the second electrode overlap each other by a first amount, wherein, in an activated condition, the first electrode and the second electrode overlap each other by a second amount, and wherein the second amount is greater than the first amount.

6. The actuator of claim 4, wherein, when the electrostatic clutch is activated, the first electrode and the second electrode are electrostatically attracted to each other such that the first electrode and the second electrode do not move relative to each other.

7. The actuator of claim 1, wherein the one or more actuator body members include:
- a first endcap; and
- a second endcap positioned opposite the first endcap, wherein the one or more shape memory material members and the electrostatic clutch are operatively connected to the first endcap and the second endcap;
- a first outer body member, the first outer body member being bowed, the first outer body member including a first end and a second end, the first end being operatively connected to the first endcap and the second end being operatively connected to the second endcap; and
- a second outer body member, the second outer body member being bowed, the second outer body member including a first end and a second end, the first end being operatively connected to the first endcap and the second end being operatively connected to the second endcap,
- wherein the first and second outer body members are made of a flexible material and are arranged on opposite sides of the one or more shape memory material members and the electrostatic clutch.

8. A system comprising:
- an actuator including one or more shape memory material members and an electrostatic clutch; and
- one or more processors operatively connected to selectively and independently activate the one or more shape memory material members and the electrostatic clutch,
- when an activation input is provided to the one or more shape memory material members, the one or more shape memory material members contract, thereby causing the actuator to morph into an activated configuration in which a height of the actuator increases,
- the electrostatic clutch being configured to maintain the actuator in the activated configuration when the activation input to the one or more shape memory material members is discontinued.

9. The system of claim 8, further including:
- one or more power sources operatively connected to supply electrical energy to the one or more shape memory material members and to the electrostatic clutch, wherein the one or more processors are operatively connected to the one or more power sources, wherein the one or more processors are configured to selectively control a supply of electrical energy to the one or more shape memory material members and to the electrostatic clutch.

10. The system of claim 9, wherein the one or more processors are configured to:
- activate the one or more shape memory material members to cause the one or more shape memory material members to contract, thereby causing the actuator to morph into the activated configuration; and
- activate the electrostatic clutch while the one or more shape memory material are activated; and
- deactivate the one or more shape memory material members, whereby the actuator is maintained in the activated configuration by the electrostatic clutch.

11. The system of claim 9, wherein the one or more shape memory material members are arranged in a serpentine pattern.

12. The system of claim 9, wherein the one or more shape memory material members include one or more shape memory alloy wires.

13. The system of claim 9, wherein the electrostatic clutch includes a first electrode and a second electrode, wherein the first electrode and the second electrode are substantially parallel to each other, and wherein the first electrode and the second electrode are configured to slide relative to each other.

14. The system of claim 13, wherein, in a non-activated condition, the first electrode and the second electrode overlap each other by a first amount, wherein, in an activated condition, the first electrode and the second electrode overlap each other by a second amount, and wherein the second amount is greater than the first amount.

15. The system of claim 13, wherein, when the electrostatic clutch is activated, the first electrode and the second electrode are electrostatically attracted to each other such that the first electrode and the second electrode do not move relative to each other.

16. The system of claim 9, wherein the actuator further includes:
- a first endcap; and
- a second endcap positioned opposite the first endcap, wherein the one or more shape memory material members and the electrostatic clutch are operatively connected to the first endcap and the second endcap;
- a first outer body member, the first outer body member being bowed, the first outer body member including a first end and a second end, the first end being operatively connected to the first endcap and the second end being operatively connected to the second endcap; and
- a second outer body member, the second outer body member being bowed, the second outer body member including a first end and a second end, the first end being operatively connected to the first endcap and the second end being operatively connected to the second endcap,
- wherein the first and second outer body members are made of a flexible material and are arranged on opposite sides of the one or more shape memory material members and the electrostatic clutch.

17. An actuation method for an actuator including one or more shape memory material members and an electrostatic clutch, the method comprising:
- activating the one or more shape memory material members to cause the one or more shape memory material members to contract, thereby causing the actuator to morph into an activated configuration, whereby a height of the actuator increases;
- activating the electrostatic clutch while the one or more shape memory material members are activated; and
- deactivating the one or more shape memory material members, whereby the actuator is maintained in the activated configuration by the electrostatic clutch.

18. The actuation method of claim 17, further including:
- deactivating the electrostatic clutch, whereby the actuator substantially returns to a non-activated configuration.

19. The method of claim 17, wherein the electrostatic clutch includes a first electrode and a second electrode, wherein the first electrode and the second electrode are substantially parallel to each other, wherein the first electrode and the second electrode are configured to slide relative to each other, and wherein, when the actuator goes from a non-activated configuration to the activated configuration, the first electrode and the second electrode overlap each other by an increased amount.

20. The method of claim 19, wherein, when the electrostatic clutch is activated, the first electrode and the second electrode are electrostatically attracted to each other such that the first electrode and the second electrode do not move relative to each other.

* * * * *

UNITED STATES PATENT AND TRADEMARK OFFICE
CERTIFICATE OF CORRECTION

PATENT NO. : 12,152,570 B2  
APPLICATION NO. : 18/172637  
DATED : November 26, 2024  
INVENTOR(S) : Yufei Zhu et al.

Page 1 of 1

It is certified that error appears in the above-identified patent and that said Letters Patent is hereby corrected as shown below:

On the Title Page

Item (54), In the Title: delete "SHAPE MEMORY MATERIAL MEMBER-BASED ACTUATOR WITH ELECTROSTATIC CLUTCH PRELIMINARY CLASS" and insert --SHAPE MEMORY MATERIAL MEMBER-BASED ACTUATOR WITH ELECTROSTATIC CLUTCH--

Item (73), In the Assignees field: delete "Toyota (JP)" and insert --Toyota-shi, Aichi-ken (JP)--

In the Specification

Column 1, Lines 1-4: delete "SHAPE MEMORY MATERIAL MEMBER-BASED ACTUATOR WITH ELECTROSTATIC CLUTCH PRELIMINARY CLASS" and insert --SHAPE MEMORY MATERIAL MEMBER-BASED ACTUATOR WITH ELECTROSTATIC CLUTCH--

Column 14, Line 41: delete "microampere (A)" and insert --microampere (µA)--

Signed and Sealed this  
Thirty-first Day of December, 2024

Derrick Brent  
*Acting Director of the United States Patent and Trademark Office*